US012665744B2

(12) United States Patent
Lablans

(10) Patent No.: US 12,665,744 B2
(45) Date of Patent: Jun. 23, 2026

(54) ENCRYPTION CLOAKING WITH A MODIFIED RADIX-N FUNCTION FOR ENHANCED SECURITY

(71) Applicant: Peter Lablans, Morris Township, NJ (US)

(72) Inventor: Peter Lablans, Morris Township, NJ (US)

( * ) Notice: Subject to any disclaimer, the term of this patent is extended or adjusted under 35 U.S.C. 154(b) by 47 days.

(21) Appl. No.: 18/908,321

(22) Filed: Oct. 7, 2024

(65) Prior Publication Data

US 2025/0158803 A1 May 15, 2025

Related U.S. Application Data

(60) Provisional application No. 63/553,456, filed on Feb. 14, 2024, provisional application No. 63/548,184, filed on Nov. 11, 2023.

(51) Int. Cl.
*H04L 9/06* (2006.01)

(52) U.S. Cl.
CPC .................................. *H04L 9/0631* (2013.01)

(58) Field of Classification Search
CPC .............................. H04L 9/0631; H04L 9/006
See application file for complete search history.

(56) References Cited

U.S. PATENT DOCUMENTS 3,818,452 A * 6/1974 Greer ............... H03K 19/17712
326/38
3,958,081 A * 5/1976 Ehrsam ................. H04L 9/0625
380/37

3,962,539 A * 6/1976 Ehrsam ................. H04L 9/0625
380/37
4,165,444 A * 8/1979 Gordon ................. H04L 9/0662
380/265
4,987,324 A * 1/1991 Wong ............... H03K 19/09429
326/27
5,054,066 A * 10/1991 Riek ........................ H04L 9/304
713/170
5,995,539 A * 11/1999 Miller ............... H04L 25/03343
375/222

(Continued)

OTHER PUBLICATIONS

Sim et al., Lightweight MDS Involution Matrices (Full version), 2015, downloaded from https://eprint.iacr.org/2015/258.pdf.

(Continued)

*Primary Examiner* — Rupal Dharia
*Assistant Examiner* — Devin E Almeida

(57) ABSTRACT

A cryptographic computer processes a word of p bits in an electronic message as a set of k n-state elements with n an integer greater than 2 and 2^p>n and k>1, with the p bits being characterized as a word of k n-state elements. The computer processes two words of k n-state elements as an radix-n operation that includes a 2 operand reversible n-state operation of which an output is a residue and a 2 operand n-state transition function of which an output is an n-state transition element. An output of the radix-n operation is a word of k n-state elements. The radix-n operation is preferably not reversible and is part of an operation that generates a cryptographic message. A standard cryptographic operation is modified by applying the radix-n operation. The cryptographic message is transmitted over a physical channel.

20 Claims, 10 Drawing Sheets

(56)                 References Cited

U.S. PATENT DOCUMENTS

| | | | | |
|---|---|---|---|---|
| 6,052,704 A * | 4/2000 | Wei | G06F 7/724 | 708/492 |
| 6,111,952 A * | 8/2000 | Patarin | H04L 9/3247 | 380/259 |
| 8,332,727 B2 * | 12/2012 | Kim | G06F 11/1068 | 714/763 |
| 8,666,062 B2 * | 3/2014 | Lambert | G06F 7/726 | 713/169 |
| 10,515,567 B2 * | 12/2019 | Lablans | G06F 5/012 | |
| 11,093,213 B1 * | 8/2021 | Lablans | G06F 5/012 | |
| 11,336,425 B1 * | 5/2022 | Lablans | H04J 13/0029 | |
| 12,056,549 B1 * | 8/2024 | Lablans | H04L 9/3066 | |
| 2002/0038420 A1 * | 3/2002 | Collins | H04L 9/3249 | 713/156 |
| 2005/0094806 A1 * | 5/2005 | Jao | G06F 7/725 | 380/30 |
| 2005/0267926 A1 * | 12/2005 | Al-Khoraidly | G06F 7/724 | 708/492 |
| 2006/0149962 A1 * | 7/2006 | Fountain | H04L 9/0897 | 713/151 |
| 2007/0011453 A1 * | 1/2007 | Tarkkala | H04L 9/3247 | 713/168 |
| 2007/0152710 A1 * | 7/2007 | Lablans | H03K 19/20 | 326/59 |
| 2008/0013716 A1 * | 1/2008 | Ding | H04L 9/3093 | 380/30 |
| 2008/0054944 A1 * | 3/2008 | Kwon | H03K 19/094 | 326/83 |
| 2008/0069345 A1 * | 3/2008 | Rubin | H04L 9/0841 | 380/44 |
| 2008/0143561 A1 * | 6/2008 | Miyato | H04L 9/0618 | 341/79 |
| 2008/0180987 A1 * | 7/2008 | Lablans | G06F 7/49 | 365/189.08 |
| 2008/0244274 A1 * | 10/2008 | Lablans | H04L 9/0662 | 708/492 |
| 2008/0273695 A1 * | 11/2008 | Al-Gahtani | G06F 16/13 | 380/30 |
| 2009/0092250 A1 * | 4/2009 | Lablans | G06F 7/582 | 380/255 |
| 2009/0146851 A1 | 6/2009 | Lablans | | |
| 2009/0220083 A1 * | 9/2009 | Schneider | H04L 9/0662 | 380/42 |
| 2009/0310775 A1 * | 12/2009 | Gueron | H04L 9/0643 | 380/28 |
| 2010/0086132 A1 * | 4/2010 | Tavernier | H04L 9/304 | 380/255 |
| 2010/0115017 A1 * | 5/2010 | Yen | G06F 7/724 | 708/492 |
| 2010/0208885 A1 * | 8/2010 | Murphy | H04L 9/004 | 380/28 |
| 2010/0271100 A1 * | 10/2010 | Le | G05F 1/46 | 327/269 |
| 2010/0299579 A1 * | 11/2010 | Lablans | H03M 13/3983 | 714/781 |
| 2010/0306525 A1 * | 12/2010 | Ferguson | H04L 63/06 | 713/151 |
| 2011/0016321 A1 * | 1/2011 | Sundaram | H04L 67/34 | 713/171 |
| 2011/0033046 A1 * | 2/2011 | Nonaka | H04L 9/3093 | 380/46 |
| 2011/0211691 A1 * | 9/2011 | Minematsu | H04L 9/0618 | 380/46 |
| 2011/0213982 A1 * | 9/2011 | Brown | H04L 9/3252 | 713/176 |
| 2011/0243320 A1 * | 10/2011 | Halevi | H04L 9/0861 | 380/30 |
| 2012/0023336 A1 * | 1/2012 | Natarajan | H04L 9/0841 | 713/179 |
| 2012/0027198 A1 * | 2/2012 | He | H04L 9/06 | 380/28 |
| 2012/0027210 A1 * | 2/2012 | Takeuchi | H04L 9/3263 | 380/255 |
| 2012/0121084 A1 * | 5/2012 | Tomlinson | H04L 9/304 | 380/30 |
| 2017/0230509 A1 * | 8/2017 | Lablans | H04J 13/0033 | |
| 2021/0405518 A1 * | 12/2021 | Lablans | H04N 13/243 | |
| 2023/0125560 A1 * | 4/2023 | Lablans | H03M 7/00 | 380/28 |
| 2024/0356727 A1 * | 10/2024 | Lablans | H04L 9/32 | |

OTHER PUBLICATIONS

Billy B. Brumley, Secure and Fast Implementations of Two Involution Ciphers, 2010, downloaded from https://eprint.iacr.org/2010/152.

* cited by examiner

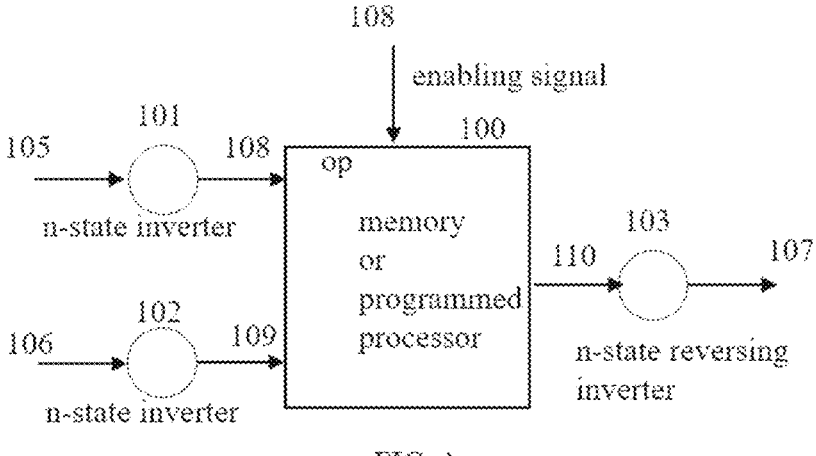
FIG. 1
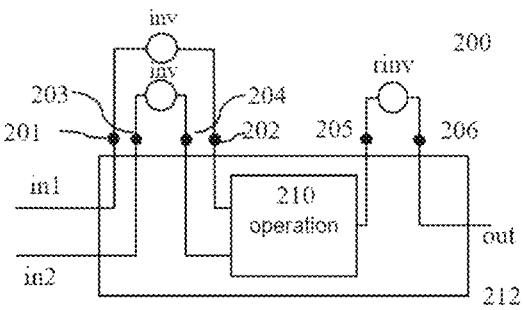
FIG. 2
301
| 1 | 1 | 1 | 1 | 1 | 1 | 1 | 1 |
| 1 | 2 | 1 | 2 | 1 | 2 | 1 | 2 |
| 1 | 1 | 3 | 3 | 1 | 1 | 3 | 3 |
| 1 | 2 | 3 | 4 | 1 | 2 | 3 | 4 |
| 1 | 1 | 1 | 1 | 5 | 5 | 5 | 5 |
| 1 | 2 | 1 | 2 | 5 | 6 | 5 | 6 |
| 1 | 1 | 3 | 3 | 5 | 5 | 7 | 7 |
| 1 | 2 | 3 | 4 | 5 | 6 | 7 | 8 |
FIG. 3

```
function y=labtransform(table,invert)
% lab-transform or finite lab-transfer or FLT inverts n-state
% switching table 'table' with n-state inverter 'invert' at inputs and
% reversing inverter 'rinvert' at output
% the table and inverter are in origin 1
% Copyright 2017 Ternarylogic LLC. All right reserved % determine size of 'table'
lent=size(table);
len=lent(2); % len is n % initialize 'tableinv' and 'rinvert'
rinvert=ones(1,len);
tableinv=zeros(len,len);

% determine 'rinvert' from 'invert'
for i=1:len
    for i2=1:len
        k1=invert(i1); % invert input 1
        k2=invert(i2); % invert input 2
        aa=table(k1,k2);
        tableinv(i1,i2)=rinvert(aa);% invert output
    end
end
y=tableinv; % the lab-transformed switching table
```

FIG. 6

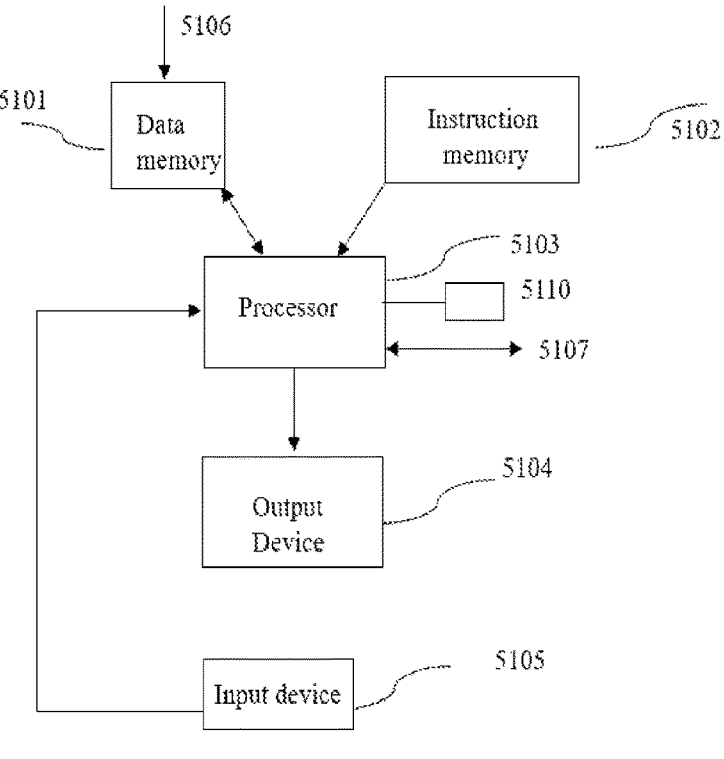

FIG. 7

| | | | | | |
|---|---|---|---|---|---|
| D | 1 | 1 | 1 | 1 | 1 |
| B | | 1 | 1 | 1 | 2 |
| r | 1 | 1 | 1 | 1 | 2 |
| b | 1 | 1 | 1 | 2 | |
| r | 1 | 1 | 1 | 2 | |
| b | 1 | 1 | 2 | | |
| r | 1 | 1 | 2 | | |
| b | 1 | 2 | | | |
| r | 1 | 2 | | | |
| b | 2 | | | | |
| A' | 2 | 2 | 2 | 2 | 2 |

```
function y=addmodnfsil(addn,carn,inn,keyn,tele,invn)
% Copyright © 2023 Peter Lablans
rinvn=makerinvn(invn);
inp=inn;
key=keyn;

lent=size(inp);
len=lent(2);
uu=rinvn(1);
res=zeros(1,len)+uu;
car=zeros(1,len)+uu;
aa=inp;
bb=key;
aa(1)=uu;
bb(1)=uu;
for i=1:tele
    aan=resid(aa,bb,addn);
    bbn=caridf(aa,bb,carn,uu);
    aa=aan;
    bb=bbn;
end
y=aa;
```

FIG. 12

1801
```
function y=resid(a,b,addn)
% residue radix-n
lent=size(a);
len=lent(2);
y=ones(1,len);
for i=1:len
    y(i)=addn(a(i),b(i));
end
```

1802
```
function y=caridf(a,b,carn,uu)
% carry mod n
lent=size(a);
len=lent(2);
y=zeros(1,len)+uu;
for i=1:len-1
    y(i)=carn(a(i+1),b(i+1));
end
```

FIG. 13 sc4 =

| 1 | 2 | 3 | 4 |
|---|---|---|---|
| 2 | 3 | 4 | 1 |
| 3 | 4 | 1 | 2 |
| 4 | 1 | 2 | 3 | min4 =

| 1 | 4 | 3 | 2 |
|---|---|---|---|
| 2 | 1 | 4 | 3 |
| 3 | 2 | 1 | 4 |
| 4 | 3 | 2 | 1 |

FIG. 14 car4 =

| 1 | 1 | 1 | 1 |
|---|---|---|---|
| 1 | 1 | 1 | 2 |
| 1 | 1 | 2 | 2 |
| 1 | 2 | 3 | 2 | bor4 =

| 1 | 2 | 2 | 2 |
|---|---|---|---|
| 1 | 1 | 2 | 2 |
| 1 | 1 | 1 | 3 |
| 1 | 1 | 1 | 1 |

FIG. 15 sc4 =

| 1 | 2 | 3 | 4 |
|---|---|---|---|
| 2 | 1 | 4 | 3 |
| 3 | 4 | 1 | 2 |
| 4 | 3 | 2 | 1 | car4 =

| 1 | 1 | 1 | 1 |
|---|---|---|---|
| 1 | 2 | 1 | 2 |
| 1 | 1 | 3 | 3 |
| 1 | 2 | 3 | 4 |

FIG 16

| 1 | 1 | 1 | 1 | 1 | 1 | 1 | 1 |
|---|---|---|---|---|---|---|---|
| 1 | 2 | 1 | 2 | 1 | 2 | 1 | 2 |
| 1 | 1 | 3 | 3 | 1 | 1 | 3 | 3 |
| 1 | 2 | 3 | 4 | 1 | 2 | 3 | 4 |
| 1 | 1 | 1 | 1 | 5 | 5 | 5 | 5 |
| 1 | 2 | 1 | 2 | 5 | 6 | 5 | 6 |
| 1 | 1 | 3 | 3 | 5 | 5 | 7 | 7 |
| 1 | 2 | 3 | 4 | 5 | 6 | 7 | 8 |

FIG. 17

```
function y=elemtabn(n,d,crn,base)
% make n-state table of extension of base to d elements
% using base being radix of cr2
% example car256=elemtabn(256,8,and2,2)
% 256=2^d with d=8 cr2 is AND2 which operates in base 2
% Copyright © 2023 Peter Lablans
y=ones(n,n);
aa4=ones(1,d);
for i1=0:n-1
    for i2=0:n-1
    ii1=dum2radn(i1,base,d)+1;
    ii2=dum2radn(i2,base,d)+1;
    aa4=carnall(ii1,ii2,crn);
    aa=radn2num(aa4-1, base)+1;
    y(i1+1,i2+1)=aa;
    end
end
```

FIG. 18

$$T_1 = h + \sum_0^{256}(e) + Ch(e,f,g) + K_i^{256} + W_i$$
$$T_2 = \sum_0^{256}(a) + Maj(a,b,c)$$

FIG. 19

| | | | | | |
|---|---|---|---|---|---|
| a | | a1 | a2 | a3 | a4 | 2701 |
| b | | b1 | b2 | b3 | b4 |
| r1 | | r11 | r12 | r13 | r14 |
| c1 | | c11 | c12 | c13 | |
| r2 | | r21 | r22 | r23 | |
| c2 | | c21 | c22 | | |
| r3 | | r31 | r32 | | |
| c3 | | c31 | | | |
| r4 | | r41 | | | |
| c4 | cout | | | | |
| S | | r41 | r32 | r23 | r14 |

FIG. 20

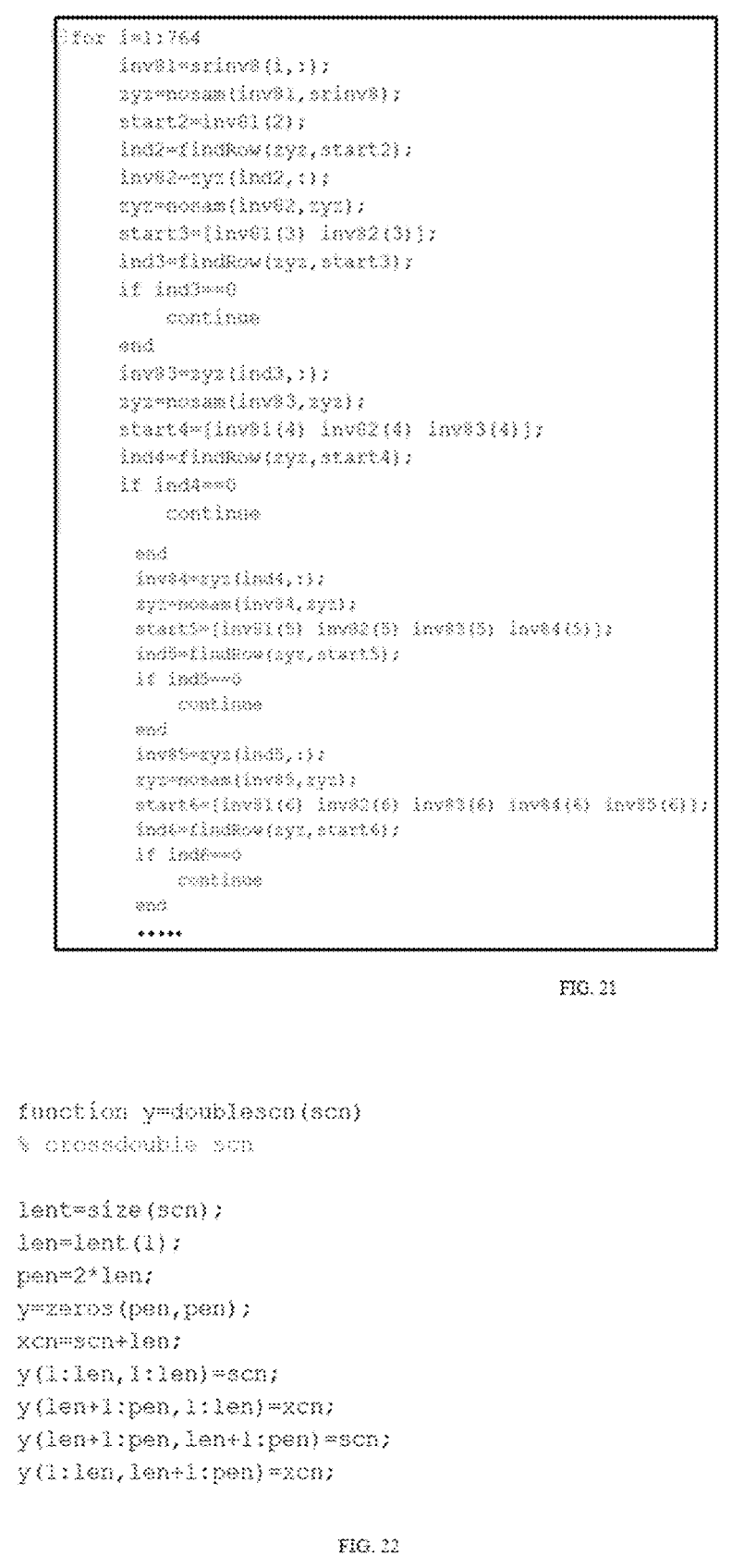

```
for i=1:764
    inv81=srinv8(i,:);
    xyz=nosam(inv81,srinv8);
    start2=inv81(2);
    ind2=findRow(xyz,start2);
    inv82=xyz(ind2,:);
    xyz=nosam(inv82,xyz);
    start3=[inv81(3) inv82(3)];
    ind3=findRow(xyz,start3);
    if ind3==0
        continue
    end
    inv83=xyz(ind3,:);
    xyz=nosam(inv83,xyz);
    start4=[inv81(4) inv82(4) inv83(4)];
    ind4=findRow(xyz,start4);
    if ind4==0
        continue end
    inv84=xyz(ind4,:);
    xyz=nosam(inv84,xyz);
    start5=[inv81(5) inv82(5) inv83(5) inv84(5)];
    ind5=findRow(xyz,start5);
    if ind5==0
        continue
    end
    inv85=xyz(ind5,:);
    xyz=nosam(inv85,xyz);
    start6=[inv81(6) inv82(6) inv83(6) inv84(6) inv85(6)];
    ind6=findRow(xyz,start6);
    if ind6==0
        continue
    end
    .....
```

FIG. 21

```
function y=doublescn(scn)
% crossdouble scn lent=size(scn);
len=lent(1);
pen=2*len;
y=zeros(pen,pen);
xcn=scn+len;
y(1:len,1:len)=scn;
y(len+1:pen,1:len)=xcn;
y(len+1:pen,len+1:pen)=scn;
y(1:len,len+1:pen)=xcn;
```

FIG. 22

| | | | | | | | | | | | | | | | |
|---|---|---|---|---|---|---|---|---|---|---|---|---|---|---|---|
| 1 | 2 | 7 | 4 | 5 | 6 | 3 | 8 | 9 | 10 | 15 | 12 | 13 | 14 | 11 | 16 |
| 2 | 1 | 3 | 5 | 4 | 8 | 7 | 6 | 10 | 9 | 11 | 13 | 12 | 16 | 15 | 14 |
| 7 | 3 | 2 | 6 | 8 | 4 | 1 | 5 | 15 | 11 | 10 | 14 | 16 | 12 | 9 | 13 |
| 4 | 5 | 6 | 1 | 2 | 3 | 8 | 7 | 12 | 13 | 14 | 9 | 10 | 11 | 16 | 15 |
| 5 | 4 | 8 | 2 | 1 | 7 | 6 | 3 | 13 | 12 | 16 | 10 | 9 | 15 | 14 | 11 |
| 6 | 8 | 4 | 3 | 7 | 1 | 5 | 2 | 14 | 16 | 12 | 11 | 15 | 9 | 13 | 10 |
| 3 | 7 | 1 | 8 | 6 | 5 | 2 | 4 | 11 | 15 | 9 | 16 | 14 | 13 | 10 | 12 |
| 8 | 6 | 5 | 7 | 3 | 2 | 4 | 1 | 16 | 14 | 13 | 15 | 11 | 10 | 12 | 9 |
| 9 | 10 | 15 | 12 | 13 | 14 | 11 | 16 | 1 | 2 | 7 | 4 | 5 | 6 | 3 | 8 |
| 10 | 9 | 11 | 13 | 12 | 16 | 15 | 14 | 2 | 1 | 3 | 5 | 4 | 8 | 7 | 6 |
| 15 | 11 | 10 | 14 | 16 | 12 | 9 | 13 | 7 | 3 | 2 | 6 | 8 | 4 | 1 | 5 |
| 12 | 13 | 14 | 9 | 10 | 11 | 16 | 15 | 4 | 5 | 6 | 1 | 2 | 3 | 8 | 7 |
| 13 | 12 | 16 | 10 | 9 | 15 | 14 | 11 | 5 | 4 | 8 | 2 | 1 | 7 | 6 | 3 |
| 14 | 16 | 12 | 11 | 15 | 9 | 13 | 10 | 6 | 8 | 4 | 3 | 7 | 1 | 5 | 2 |
| 11 | 15 | 9 | 16 | 14 | 13 | 10 | 12 | 3 | 7 | 1 | 8 | 6 | 5 | 2 | 4 |
| 16 | 14 | 13 | 15 | 11 | 10 | 12 | 9 | 8 | 6 | 5 | 7 | 3 | 2 | 4 | 1 |

| | | | | | | | |
|---|---|---|---|---|---|---|---|
| 7 | 8 | 3 | 2 | 2 | 5 | 6 | 8 |
| 2 | 6 | 2 | 7 | 3 | 6 | 1 | 8 |
| 6 | 5 | 2 | 2 | 4 | 6 | 7 | 1 |
| 4 | 5 | 2 | 1 | 5 | 1 | 1 | 7 |
| 1 | 6 | 7 | 8 | 4 | 7 | 6 | 8 |
| 8 | 5 | 5 | 5 | 3 | 5 | 8 | 7 |
| 3 | 7 | 3 | 4 | 6 | 8 | 2 | 3 |
| 7 | 6 | 1 | 2 | 4 | 2 | 8 | 8 |

2402

| | | | | | | | |
|---|---|---|---|---|---|---|---|
| 6 | 7 | 1 | 3 | 3 | 6 | 3 | 7 |
| 4 | 5 | 8 | 6 | 5 | 5 | 4 | 7 |
| 2 | 3 | 2 | 8 | 3 | 1 | 6 | 4 |
| 2 | 8 | 2 | 1 | 6 | 3 | 5 | 8 |
| 3 | 2 | 8 | 3 | 4 | 1 | 8 | 2 |
| 8 | 4 | 1 | 6 | 7 | 2 | 8 | 7 |
| 1 | 8 | 9 | 4 | 7 | 5 | 3 | 5 |
| 3 | 2 | 6 | 1 | 6 | 7 | 4 | 5 |

FIG. 24

ENCRYPTION CLOAKING WITH A MODIFIED RADIX-N FUNCTION FOR ENHANCED SECURITY

CROSS-REFERENCES TO RELATED PATENTS

This application claims the benefit of U.S. Provisional Application 63/553,456 filed on Feb. 14, 2024 and is incorporated herein by reference. This application claims the benefit of U.S. Provisional Application 63/548,184 filed on Nov. 11, 2023 and is incorporated herein by reference. This application claims the benefit of U.S. Provisional Application 63/773,331 filed on Apr. 2, 2024 and is incorporated herein by reference.

BACKGROUND OF THE INVENTION

Aspects of the present invention relate to machine cryptography. Data exchange between computing devices often takes place over communication channels that are not secure. Furthermore, networked devices are often a (unintended) gateway to the management, control and security of the network and devices attached to a network, wherein the network is often connected or part of a public network such as the Internet and may provide access to a bank account or access to a house, a garage, a car, a refrigerator, a camera, a thermostat, a cell phone, a tv device, a tablet, a PC, an industrial facility, the electricity network or other utility network, radar installation, or any other computing device that is enabled to communicate. It is important to guard against unauthorized access of connected devices and to keep the information that is exchanged as private as possible and to validate electronic messages.

Cryptographic procedures performed by machines of authentication, public and private key generation and distribution, encipherment and decipherment rely on public and standard procedures wherein at least one aspect is secret and user specific, but the steps of a procedure are known, including logic functions and/or logic circuits that are used. Many cryptographic procedures are for instance published as standards by the National Institute of Standards and Technology (NIST) of the US Department of Commerce. An advantage is that some of the best procedures are made publicly available. Because such procedures are so widely used they are also widely studied and susceptible to ever improving attacking procedures. Because the published security procedures are recognized as being among the best available, the general user is generally unable to develop a new procedure that is better than the standard ones.

It increases security if one modifies existing cryptographic procedures in an unpredictable or hard to predict way that would make attacks on security procedures harder to be successful while maintaining strong aspects of known security and cryptography programs and procedures. Accordingly, novel and improved methods and devices are required that use difficult to predict parameters in modifying standard cryptographic methods and devices and offer create new ones.

SUMMARY OF THE INVENTION

In accordance with an aspect of the present invention a cryptographic device is provided, In accordance with one or more aspects of the present invention a cryptographic device is provided, comprising: memory in a first computing device enabled to store data in and to retrieve data from, including instructions; a processor in the first computing device configured to retrieve instructions from the memory to perform the steps: implementing an n-state reversible 2 operand function and an n-state 2 operand transition function; processing as a radix-n operation upon two series of p bits as two words of k n-state elements, the radix-n operation generating with the n-state reversible 2 operand function an n-state residue element and with the n-state 2 operand transition function an n-state transition element, with n an integer greater than 3, k an integer greater than 1 and p an integer being 16 or greater; generating with the n-state reversible 2 operand function with the n-state residue element and the n-state transition element as input operands an n-state output element in an output word of k n-state elements, wherein the radix-n operation is a non-reversible operation; generating a cryptographic message from the output word of k n-state elements in an encryption or a hashing of an electronic message; and outputting the cryptographic message on a physical transmission channel to a second computing device.

In accordance with a further aspect of the present invention a cryptographic device is provided, wherein $n=2^k$.

In accordance with a further aspect of the present invention a cryptographic device is provided, wherein the n-state reversible 2 operand function is characterized as an addition over GF(n), with GF(n) being a finite field of n different elements.

In accordance with a further aspect of the present invention a cryptographic device is provided, wherein the n-state reversible 2 operand function is an involution that is not characterized as an addition over GF(n), with GF(n) being a finite field of n different elements.

In accordance with a further aspect of the present invention a cryptographic device is provided, wherein the n-state 2 operand transition function is characterized by an n by n n-state lookup table, with no more than $n+n/2$ and not fewer than $n/2$ of each n-state element.

In accordance with a further aspect of the present invention a cryptographic device is provided, wherein the k n-state elements are part of a state array in an Advanced Encryption Standard—Galois Counter Mode (AES-GCM) encryption and at least one round in an AES-GCM keystream generation is modified by replacing a bitwise XOR of the two words of p bits in the state array by the radix-n operation on k n-state elements.

In accordance with a further aspect of the present invention a cryptographic device is provided, wherein the k n-state elements are part of a state array in an ChaCha20 encryption and at least one quarter-round in a ChaCha20 keystream generation is modified by replacing a bitwise XOR of the two words of p bits in the state array by the radix-n operation on k n-state elements.

In accordance with a further aspect of the present invention a cryptographic device is provided, wherein the k n-state elements are part of a state array in an ChaCha20 encryption and at least one quarter-round in a ChaCha20 keystream generation is modified by replacing an addition modulo-$2^{32}$ of two words of p bits in the state array by the radix-n operation on k n-state elements.

In accordance with a further aspect of the present invention a cryptographic device is provided, wherein the n-state reversible 2 operand function is an FLTed version of another n-state reversible 2 operand function.

In accordance with a further aspect of the present invention a cryptographic device is provided, wherein n-state 2 operand transition function is an FLTed version of another n-state 2 operand transition function.

In accordance with a further aspect of the present invention a cryptographic device is provided, wherein the cryptographic message is generated by a cryptographic operation selected from the group consisting of an encryption, a decryption and a hashing operation.

In accordance with yet a further aspect of the present invention a cryptographic device is provided, wherein the radix-n operation is applied in a one-way manner, wherein the cryptographic message is generated as part of a cryptographic operation selected from the group consisting of ChaCha20 encryption, Advanced Encryption Standard-Galois Counter Mode (AES-GCM) encryption, Secure Hashing Standard (SHS FIPS 180-4) hashing, MD5 hashing and SHA-3 (FIPS 202) defined hashing and Keccak defined hashing.

In accordance with yet another aspect of the present invention an apparatus is provided, wherein the cryptographic circuit is selected from a processing circuit performing an encryption, a decryption, a message digest generator, a signature generator, an authentication generator, a generator of a private key/public key.

In accordance with yet another aspect of the present invention an apparatus is provided, wherein the memory contains at least 25,000 (twenty-five thousand) different configurations of an n-state 2 operand function.

In accordance with yet another aspect of the present invention an apparatus is provided, wherein the memory contains at least 100 different configurations of an n-state 2 operand function.

In accordance with yet another aspect of the present invention an apparatus is provided, wherein signals are generated by a processing circuit in accordance with a Finite Lab-transform (FLT) modified Secure Hash Standard (SHS) message digest.

In accordance with yet another aspect of the present invention an apparatus is provided, wherein signals are generated by a processing circuit in accordance with a Finite Lab-transform (FLT) modified Advanced Encryption Standard (AES).

In accordance with yet another aspect of the present invention an apparatus is provided, wherein signals are generated by a processing circuit in accordance with a Finite Lab-transform (FLT) modified published Federal Information Processing Standards (FIPS) cryptographic operation.

In accordance with yet another aspect of the present invention an apparatus is provided, wherein the apparatus is selected from the group consisting of: a computer, a mobile phone, a smart phone, a fob, a car door opener, a garage door opener, an access card, a chip card, an Automatic Teller Machine (ATM) card, a credit card, a camera.

In accordance with yet another aspect of the present invention an apparatus is provided, wherein a remote apparatus is selected from the group consisting of: a computer, a car door controller, a garage door controller, an access controller, a server, an Automatic Teller Machine (ATM), a credit card server, a database server, an order management server, a transaction server, a camera, an application server. Many applications are being hosted remotely or are accessed remotely. For instance one may install a computer program on a first computer and access it via a second computing device. One may protect access to a computer or part of a computer or computer functionality, including even access to folders on a computer, by a simple password or PIN. For high security applications and/or data one may require a higher level of protection as described herein. In that case activating a computer expressly includes activating part of a computer or computer functionality or computer application.

One may call that part of a computer. One may also apply aspects of the disclosure in a Virtual Private Network (VPN) server.

In accordance with yet a further aspect of the present invention a method is provided, wherein n>3 and an n-state symbol is represented by a plurality of bits.

BRIEF DESCRIPTION OF DRAWINGS

FIGS. 1 and 2 are diagrams of a device that modifies a switching operation in accordance with various aspects of the present invention;

FIGS. 3, 4 and 5 are screenshots of switching tables generated by a computing device in accordance with one or more aspects of the present invention;

FIG. 6 is a screenshot of computer instructions that modify a 2 operand n-state function in accordance with one or more aspects of the present invention;

FIG. 7 is a block diagram of a computing device in accordance with an aspect of the present invention;

FIG. 10 illustrates in diagram a radix-n operation on words of 4 elements;

FIG. 11 illustrates in diagram a radix-n operation on words of 4 elements that reverses the operation of FIG. 10;

FIG. 12 is a screenshot of computer instructions that perform a radix-operation in accordance with one or more aspects of the present invention;

FIG. 13 is a screenshot of computer instructions that perform a residue determination and a transition element determination of a radix-n operation in accordance with one or more aspects of the present invention;

FIG. 14 is a screenshot of look-up tables of reversible n-state operations;

FIG. 15 is a screenshot of look-up tables of n-state transition element operations;

FIG. 16 is a screenshot of a reversible n-state operation and a screenshot of a corresponding canonical n-state transition function;

FIG. 17 is a screenshot of a canonical 8-state transition function;

FIG. 18 is a screenshot of computer instructions that generate an n-state operation of 2 words of 2 or more p-state elements with p<n.

FIG. 19 illustrates expressions that characterize computer operations in a hashing operation;

FIG. 20 illustrates in diagram a radix-n operation;

FIG. 21 is a screenshot of a computer program to generate novel involutions in accordance with various aspects of the present invention;

FIG. 22 is a screenshot of a computer program to extend an involution in accordance with one or more aspects of the present invention;

FIG. 23 is a screenshot of a 16-state novel involution generated in accordance with one or more aspects of the present invention;

FIG. 24 is a screenshot of 8 by 8 8-state transitional functions generated in accordance with one or more aspects of the present invention.

DETAILED DESCRIPTION

Figure 8:
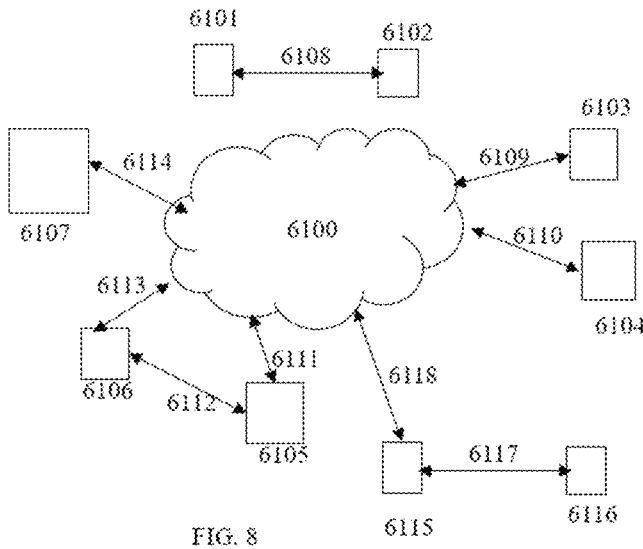
FIG. 8 illustrates network configurations in accordance with various aspects of the present invention.

Previous patent applications, as incorporated herein by reference, teach a modification of a discrete computer switching functions, which is called herein a primitive computer switching function, a primitive switching function, a primitive function, an n-state primitive computer switching function, an n-state primitive switching function or an n-state computer function. It is believed that one of ordinary skill knows directly or from the context of this disclosure what is meant by these terms. It will be explained again and superfluously, it is believed, next.

Computer devices apply components that operate on discrete signals and that have at least one input and often two or more inputs and at least one output. A discrete signal is a physical phenomenon, such as a voltage or a current, a resistance, a potential, a light intensity or light frequency, a quantum-mechanical, a mechanical, a magnetic, an electromagnetic or any other physical phenomenon that is detected by and/or in a device. The appearance of a physical phenomenon has a particular value (a measurable value or an absence thereof) or falls in a range of values. In describing a working of a discrete switching device, commonly a representative state is used to represent the actual physical value of the signal. The state of the signal also may represent the physical state of the device.

For instance, a computer device may work in a binary or 2-state mode. Signals in such a device fall in a range of two values, wherein a first range is designated as for instance state HIGH and a second range as state LOW. In CMOS, a binary XOR device, such as cd74hc86 of Texas Instruments operates is a range of HIGH and LOW values, wherein in operational conditions these ranges do not overlap. For instance the HIGH value is not higher than the DC supply value and never lower than 3.15V at a Vcc of 4.5V and LOW is never higher than 1.35 V at a Vcc of 4.5 V. These and other conditions are explained in the cd74hc86 datasheet, published by Texas Instruments on September 2003, which is incorporated herein by reference. The switching behavior of the XOR device is provided in a switching or truth table on page 2 in the datasheet. One can see that the datasheet refers to states L (=low) and H (=high.) According to the datasheet, these binary states L and H represent 2 ranges of Voltages.

Another way to represent the input and output voltages is by assigning a numerical value to the states L and H. For instance, the state L is called 0 and the state H is called 1. This changes nothing in the device itself. It only changes how the physical state is interpreted. It should be clear that the state 0 is not 0 Volt and the state 1 is not 1 Volt in this case. For presentation and input devices may be included to assign these states to a voltage. For instance a computer may have as input a keyboard with keys representing digits. Hitting a key with label 1, may cause a signal of 3.5 Volt (representing state 1) to be provided on an input. A signal of 3.5 Volt may be generated on an output of a device such as an XOR device. This signal may be provided to a display. A character generator of the display may recognize the 3.5 Volt as a discrete binary signal that represents 1 and generate pixels of a character 1 that is activated on the display. This demonstrates that the XOR device merely switches signals in accordance with a physical structure of the device and that the signals are represented by states, in one case the binary states 0 and 1. One may give any name to the signals like COLD and WARM. However, the representation by states 0 and 1, provides the impression that the XOR device performs a mathematical operation, being the modulo-2 addition. It is strongly emphasized that no addition is performed by the XOR device. For instance assume state 0 represents 0.9 Volt. The inputs 0.9V and 3.5V in accordance with the datasheet will generate 3.5V. An addition of these voltages would be 4.4V. But the XOR device does not generate 4.4V, but 3.5V. Accordingly, an XOR device is a 2-state switching device. The device may be called a Mod-2 Adder, but that is not what physically takes place. An AND switching device is often described as a modulo-2 multiplication, using representation by states 0 and 1.

This is subject matter of what is called Machine Arithmetic or Computer Arithmetic which teaches arithmetical machines based on logic components, which currently are mostly binary logic electronic components. The subject matter is disclosed in Kai Hwang, Computer Arithmetic, 1979, John Wiley and Sons, Inc. and Gerrit A. Blaauw (hereinafter "Blaauw"), Digital System Implementation, Prentice-Hall, Inc. 1976 which are both incorporated herein by reference.

There are 16 possible binary 2-input/1-output switching devices. These include the OR, AND, NAND, NOR, EQUALITY, ALWAY, NEVER, GREATER functions, as explained on pages 351 and 352 of Blaauw.

Blaauw explains on page xxvii that a digital machine can be viewed from 3 levels. The highest level is the architecture, which specifies the functional behavior of a system. The lowest level is the realization, which describes the physical components and structure of the system and would include the earlier mentioned datasheet of the XOR device. The middle level is the implementation, which describes the logical structure of the components and may use switching algebra or switching tables. A logical structure (the switching tables) may be used in different forms of realization. For instance, a switching table may be stored in a memory such as a non-transitory storage device, wherein inputs generate an address that holds the representation of an output state. A switching device may also be realized in a combinational switching device.

Furthermore, components may be realized in different technologies such as electro-mechanical relays, TTL components or CMOS components for instance, which should not be considered to be limiting. The logical structure in different technologies may be identical while the components may apply substantially different components. Accordingly, even if one works with different switching technologies or even upfront not narrowly defined switching components, one can still design the logical structure of a device. This is not unlike defining an electronic device like an amplifier. Using realizable limitations, an amplifier can be defined as a generic device with a transfer function and relevant impedances, which can be realized with different types of components.

One can thus provide a logical structure of a switching device, described by for instance switching operations (like XOR and AND) and be sure that these operations or switching functions can be physically realized. Physically realized means a physically circuit is realized that operates in accordance with the required switching table. A device herein may be cited as a function. That is: a binary switching function and an n-state switching function are not only descriptions of a functional performance, but also represent a physical realization of the switching function herein. Much discussion takes place around the concept of an "abstract idea." An arithmetical operation is often considered to be an abstract idea. To prevent such confusion, any logical operation herein is a physical operation. For convenience physical signals are represented by states to facilitate understanding of the subject matter. However: all functions herein represent not only a logical structure but also the underlying realization.

A computer may execute the following statements (as represented in Matlab for instance):

$$BAND = [12; 21]; \quad (1)$$

$$bA = 1; \quad (2)$$

$$bB = 1; \quad (3)$$

$$A = bA + 1; \quad (4)$$

$$B = bB + 1; \quad (5)$$

$$OUTPUT = BAND(A, B); \quad (6)$$

$$C = OUTPUT - 1 \quad (7)$$

The above Matlab instructions, indicated by line numbers, physically perform the following steps. In step (1) non-transitory memory (until overwritten) loads on identified addresses indicated by name BAND, 4 data elements, being addressable elements in a 2 by 2 array. The stored data elements are generally not in volts the value of the data elements. In general a data element is a fixed length binary word that is presented by a conversion on a display as stored values 1 and 2.

How data elements are stored and retrieved is well known in the art. In general an address coder/decoder is applied. Physical housekeeping procedures, such as assigning symbolic names as variables to memory addresses and so on are hidden from computer users by internal operating system and programming language features. However, it is understood that these housekeeping facilities are physical operations. The physical working of processors and memory management and communication protocols are well known to one of ordinary skill. The working of for instance micro-processors in that regard is explained in the book The Intel Microprocessors, Eight Edition, Barry B. Brey, Pearson Prentice Hall, Columbus, Ohio, 2009 which is incorporated herein by reference.

BAND is thus a representation of a binary switching function table, wherein the state of the output depends on two inputs, which may be called row number and column number. Matlab starts counting indices of arrays from origin 1, as row or column number 0 do not exist in Matlab. FIG. 1 illustrates the physical operation of the switching device represented by BAND. Device 100, which may be an addressable memory or a combinational circuit, has two inputs: IN1 and IN2 and an output providing signal OUT-PUT. In case of 100 being an addressable memory, IN1 indicates an address that represents the row number of array BAND and IN2 represents the column number of switching table 101 indicated as BAND. One can see from 101 that input IN1=2 and IN2=2 generates output 1, as BAND(2,2)= 1. Often multiple switching devices are used to create an application, like a binary adder or multiplier. That means that an output of a first device is used as an input for a next device. For that reason the output of a switching device should be in the same representation as the inputs, being states 1 and 2 in this case.

One can see that table 101 represents a switching table and not a true addition. Clearly 1+2 is not 2, but BAND(1, 2)=2. It is possible to design useful composite binary switching circuits, such as a ripple carry adder circuit, representing signals as having states 1 and 2. This is because no math is performed by individual binary devices.

For better understanding of a digital design it is beneficial to represent the switching states as 0 and 1, because this then looks like modulo-2 operations, even if the switching operations do not use the actual voltages of 0 and 1 Volt. This method of representing physical states by symbolic values 0 and 1 was introduced by Claude Shannon in 1936 in his Master of Science Thesis at MIT, entitled A Symbolic Analysis of Relay and Switching Circuits, which is incorporated herein by reference. An advantage of this representation, which has been adopted universally by digital system designers, is that digital circuits can be presented by Boolean Logic statements. Unfortunately, this sometimes leads to assertions that digital binary circuits perform Boolean Logic. This is of course not true, even if colloquially this is asserted. A circuit does not perform a Boolean logic statement, no more than a falling body performs the formula of Newton's gravitational law.

In the above Matlab statement, it appears that one is stuck with the 1 and 2 state. The representation of signals as state 0 and 1 is only for human convenience. To the circuit and the operation thereof, it does not matter what the actual signals are called. To make the Matlab program better to understand for humans, the following statements are included. A first input signal bA=1 is provided in (2) and a second input signal bB=1 in (3). To comply with the origin 1 requirement of Matlab, A=bA+1 is performed in (4) and B=bB+1 in (5). This allows Matlab operations in origin 1, for instance on XOR device 100 represented by table 101.

The output of device 100 is generated by OUTPUT=BAND(A,B) in (6). For presentation on a display in origin 0, Matlab prints on a screen in (7) C=OUTPUT-1. Matlab does not display an output of a statement when a line is ended with the ";" symbol. Line/statement (7) does not end with ";" and thus the value of C is displayed on a screen. While it seems that a modulo-2 arithmetical operation is performed, the naming of states as 1 and 2 demonstrates that this is purely a switching operation.

Arithmetic and logic functions are performed by physical switching devices in computers. They are often created in an Arithmetic Logic Unit (ALU) of a processor or they may be separate functional units. In general arithmetic on computers (both floating point and integer) is a combination of instruction sets operating on hardwired instructions and operations. It is to be understood that all operations on a computer, even when designated as mathematical operations are in effect hardware switching operations.

Most processing steps on a computer relate to operations on data representing non-binary variables. These may be ASCII characters or other non-binary data. It is possible to create non-binary physical switching devices. However, currently processors mainly operate with binary switching devices. Characters are represented by binary words of 2 or more bits which are processed by binary circuitry. Floating point arithmetic operations are an example of that.

Most arithmetical and logical operations on a computer, if not all, apply standard representations and reflect standard logic and arithmetic. This includes binary and decimal arithmetic and radix-n arithmetic or modulo-n arithmetic. The standard capability of computers include possibility to perform what is often described as addition and multiplication over a finite field GF(n) with n being a prime number. Also possible is performing addition and multiplication over extension finite field GF(n=$p^k$) wherein p is a prime greater than 1 and k is an integer greater than 1. In some cases general modulo-n multiplication and/or addition is used. These operations apply switching functions that are represented by known binary and/or non-binary switching tables or switching function tables.

For convenience n-states are used in numerical form, usually in origin 0 in [0, 1, 2, . . . n–1] or in programs like Matlab in origin 1 in [1, 2, 3, . . . n]. It is to be understood that each of n states corresponds to a real physical state that may be a word of binary signals.

Accordingly, n-state switching tables herein correspond to physical switching and n-state switching devices and are physical devices. None of the devices herein performs any arithmetical operation, even though for convenience arithmetical terms may be used.

One aspect of the present invention relates to the use of non-binary or n-state inverters which can be reversible or non-reversible. An n-state inverter is characterized by n symbols of which each can assume one of n-states. For convenience a numerical representation is used running from 0 to (n–1) or from 1 to n. An n-state inverter is assumed to have n possible input states. Each input generates an output. The n-state inverter is represented by the vector expression: $[0 \ 1 \ 2 \ . . . \ n–1] \rightarrow [a0 \ a1 \ a2 \ . . . \ an–1]$. The left side represents the possible input states and the right side the output, wherein a0 is the output state generated by input state 0, a1 is the output state generated by input state 1, a2 is the output state generated by input state 2, and an–1 is the output state generated by input state n–1. The states of a0, a1, a2, . . . an–1 are selected from states 0, 1, 2, . . . n–1 and can be all different, in which case the inverter is reversible or at least two output states are the same, in which case the inverter is non-reversible.

An example of a reversible 4-state inverter is $[0 \ 1 \ 2 \ 3] \rightarrow [2 \ 0 \ 3 \ 1]$ in which input state 0 generates output state 2; input state 1 generates output state 0; input state 2 generates output state 3 and input state 3 generates output state 1. An example of a non-reversible 5-state inverters is $[0 \ 1 \ 2 \ 3 \ 4] \rightarrow [2 \ 2 \ 3 \ 1 \ 3]$. Both input states 0 and 1 generate output states 2. It is impossible in that case to determine from the output state what the input state was. The reversing n-state inverter reverses the n-state inverter back to $[0 \ 1 \ 2 \ . . . \ n–1]$. The reversing inverter of 4-state inverter $[0 \ 1 \ 2 \ 3] \rightarrow [2 \ 0 \ 3 \ 1]$ is $[0 \ 1 \ 2 \ 3]-[1 \ 3 \ 0 \ 2]$.

There are $n^n$ n-state inverters of which n! are reversible including the identity. There are over 16 million 8-state inverters of which 40,320 are reversible and includes [0 1 2 3 4 5 6 7]→[0 1 2 3 4 5 6 7] which is the identity 8-state inverter. The number of reversible inverters becomes very large when n increases. For n=16 there are over $2*10^{13}$ reversible inverters. Accordingly, the probability to predict an n-state inverter or to analyze data to determine use of an n-state inverter becomes extremely low.

There are different ways to have a machine, which herein is a digital computer or a processor or digital circuit that process discrete signals, create and store an n-state reversible inverter. The computer language Matlab (or public variant Octave) is used for illustrative examples. Matlab is close to pseudo-code and is easy to understand. It is to be understood that processing instructions provided herein may be implemented in other computer languages or technologies. For example implementation may be in APL, C, C++, C#, Java, Python, Fortran, Visual Basic, in assembler language or machine instructions or in hardware configurations. All implementations when done correctly will create the appropriate circuits to execute the herein provided machine processes. One way to simply create an n-state reversible inverter is to create a sequence of n integers in a range 1:n or 0:n–1, depending on the computer language, wherein each integers only occurs once. A Matlab instruction that performs such generation is inv=randperm(n) which generates a sequence of n integers in the range 1:n wherein each integer occurs exactly once.

Another way is to generate a sequence of n consecutive integers aa=1:n and select at random an integers while maintaining a counter. AA=1:n; x=AA(randi(lengths(AA), 1)) and inv(i)=x (select at random an integer from AA as the ith element of inv; remove the selected element from AA: AA(x)=[ ]. Another way to create a reversible n-state inverter is to apply a rule that guarantees a bijection modification. For instance inv(i)=a*i+b mod-n would be such a rule. Other rules are contemplated, for instance a rule including transposition.

When to use a rule and when to generate a random n-state inverter. That depends on how large n is. The n-state inverter will be used in the Finite Lab-Transform or FLT, which is a modification of an at least 2-operand n-state operation. An n-state operation itself can be implemented in different ways in a computer. For instance, a 2-operand operation known as an addition over GF(2k) is physically an bitwise XOR of two words of k-bits. One may physically realize that by using a set of k XORs. However, one may also create an n by n table that is addressable by 2 inputs. Rather than actually executing XORs one may find the result in a table by using the inputs to form an address. In Matlab that is extremely simple to achieve. For instance one may create a 16 by 16 table sc16 representing in decimal form the bitwise XOR of words of 4 bits and use as input the decimal operands. For instance OP1=[10 11] is represented by decimal 11. Assume OP2 also to be [10 11] and the XOR(OP1,OP2)=[0 0 0 0]. This can be executed by stared table sc16 as sc16(11,11)=0. Unfortunately arrays and vectors in Matlab are indexed starting at 1 (origin-1). This requires to represent all data by data+1. And thus in Matlab it would be implemented in sc16(12,12)=1. In one way this is unfortunate for human understanding. On the other had it shows that this aspect of 'computer arithmetic' is a machine operation that is different from human arithmetic. There is no inherent awareness or meaning in machines what a signal represents. It all has to be defined, constructed and/or programmed.

Cryptography and error correction codes commonly uses functions that determine a finite field or Galois Field GF(n). The functions that determine the Galois field are generally called the addition and multiplication. However, there is often no direct relation between "normal" or radix-n addition and multiplication and Galois Field addition and multiplication for extension fields of Galois Fields. All Galois Fields have a neutral element $e_{scn}$ for the operation "addition" designated by "scn" so that scn(ak,$e_{scn}$)=ak. Such neutral element is also called the "zero element." Its connection with the second operation which is usually called multiplication or "mn" is that operation mn(ak,$e_{scn}$)=$e_{scn}$. For understanding one can assume the Galois Field GF(5) wherein the addition operation is "sc5" and is the modulo-5 addition. The neutral element or zero element $e_{sc5}$ is 0. The multiplication operation "m5" is the modulo-5 multiplication, wherein multiplication of any element with $e_{sc5}$=0 provides 0. The operation "mn" also has a neutral element $e_{mn}$ so that mn(ak,$e_{mn}$)=ak. For the multiplication m5 over GF(5) the neutral element $e_{m5 \ is}$ 1. The inventor found that this aspect of using field operations over GF(n) facilitates cryptanalysis and that modification of the finite field GF(n) into an alternate finite field aGF(n) with modified addition and multiplication and modified zero and neutral elements would make cryptanalysis much more difficult. These aspects are disclosed in for instance U.S. patent application Ser. No. 12/952,482 filed on Nov. 23, 2010, which is incorporated herein by reference ('the 482 application').

How to create an alternate finite field aGF(n) from GF(n) with reversible n-state inverters was disclosed earlier by the inventor in U.S. patent application Ser. No. 14/064,089 filed Oct. 25, 2013 (the "089 application") and is repeated here to provide context. Now referring to FIG. 1, a switching table representing the n-state function "scn" or "mn" is stored in an addressable memory 100 with two inputs and one output. Different realizations of switching tables are possible as one of ordinary skill in the art knows. The input states represented by signals on inputs form the address of the memory where upon the output state is stored. The memory 100 has two inputs 108 and 109 which determine the address of memory elements that outputs its content on output 110. Reversible n-state inverter 101 with input 105 is connected to input 108 of memory 100. N-state inverter 102 which is identical to inverter 101 with input 106 is connected to input 109. The output 110 of memory 100 is connected to n-state inverter 103 with output 107. N-state inverter 103 reverses inverter 101 back to the identity state [0 1 2 . . . n–1]. An input 108 on the memory may be enabled to receive an enabling signal to make sure that memory 100 is ready to provide appropriate output.

An n-state inverter, which may be reversible, can be realized in different components, like the n by n switching table, as one of ordinary skill will know. An n-state symbol in binary technology in one embodiment of the present invention is represented by a binary word, which by itself is usually represented by a plurality of binary signals. A first realization of an n-state inverter is by storage of the inverter output states (or rather signals) in an addressable memory wherein an input state forms an address in the memory that is activated and the output is the inversed state stored at the memory address. A second realization is by way of a combinational binary circuit. One can for instance define the input and output states as binary words in a Karnaugh map and construct a combinational binary circuit on that basis as is known in the art. A third realization is on a processor with a memory. For instance in Matlab one defines a 4-state inverter as a 1 by 4 array, which may be called inverter 'invert4'. For example a Matlab instruction is: invert4=[4 3 2 1]. Matlab works origin 1. Assume one variable 'input1' has the value 3 or: input1=3. Matlab then inverts 'input1' to 'invinput1' in accordance with inverter invert4 by the instruction: invinput1=invert4(input1). The result is invinput1 is 2. And thus the input is inverted with an inverter.

The underlying realization of the instructions and inversion by the processor is known to one of ordinary skill in computer circuit design and is well aware of the physical processes that are being performed, even though a user may only see symbols on a screen. The symbols on a screen are only for human consumption and are not needed for performing the actual inversion. For instance a device may receive a signal representing a 256-state signal that needs to be processed, for instance in accordance with a 256-state inverter. The received signal is demodulated and otherwise processed to provide for instance an 8-bit byte to an inverter execution that generates the inverted 8-bit byte. The inverted 8-bit byte may be used for further processing by the processor or may be processed to be displayed on a screen by the processor.

The device illustrated in FIG. 1 transforms the n-state switching table that characterizes the device between inputs 108 and 109 and output 110 to a device with a transformed n-state switching table that characterizes the device between inputs 105 and 106 and output 107. The terminology is used herein that says that the original n-state switching table as stored and realized in memory or realized in a circuit is 'transformed' to a new or Lab-transformed n-state switching table that characterizes the device in FIG. 1 between 105, 106 and 107. The transformation of an operation and/or a transformation of a device as shown in FIG. 1 is called the Finite Lab-Transform or FLT for short. It has as requirement that there are two or more identical reversible n-state inverters at every input that receives n-state data that is being processed by the FLTed method and/or device and a corresponding reversing n-state inverter at the output wherein a combination of the input inverter with the output inverter establishes identity. One may represent that relation as inv(rinv(x))=x.

In some cases one may apply an n-state inverter at the output that is not a corresponding reversion inverter to the input inverter. This is herein considered to be an equivalent to an FLTed modification of an operation and/or circuit and without an explicit exception will be assumed to be an FLT.

The FLT has as an important property that it preserves meta-properties of an operation and or switching circuit. In some cases, such as one-way functional operations, this preservation of properties such as associativity may not be significant. In that case one may apply a modified FLT or mFLT as described herein later.

A Lab-transformed n-state switching table is a first n-state n by n switching table transformed by using identical n-state reversible inverters to transform first and second inputs to the first n-state n by n switching table and transforms the output with a reversing inverter to the n-state reversible inverter that combined with the n-state reversible inverter forms an n-state identity inverter. An input to a table is an index or address of a row or a column of a 2-dimensional n by n table. For convenience a top input of a 2-input device such as in FIG. 1 corresponds with a row index of an n-state switching table and a bottom input corresponds to a column index of the n-state switching table. One is again reminded that inputs on a device receive a signal, not a symbol or a state. The symbol or state indication is merely used for convenience to represent that a symbol represents a signal and that different symbols indicate different signals.

The switching table of 100 performs an operation that may be called 'op' for convenience or 'sc' for addition or 'm' for multiplication. One of ordinary skills knows that with known techniques, such as Karnaugh map, the switching table can be performed by a combinational digital circuit.

Figures 4, 5:
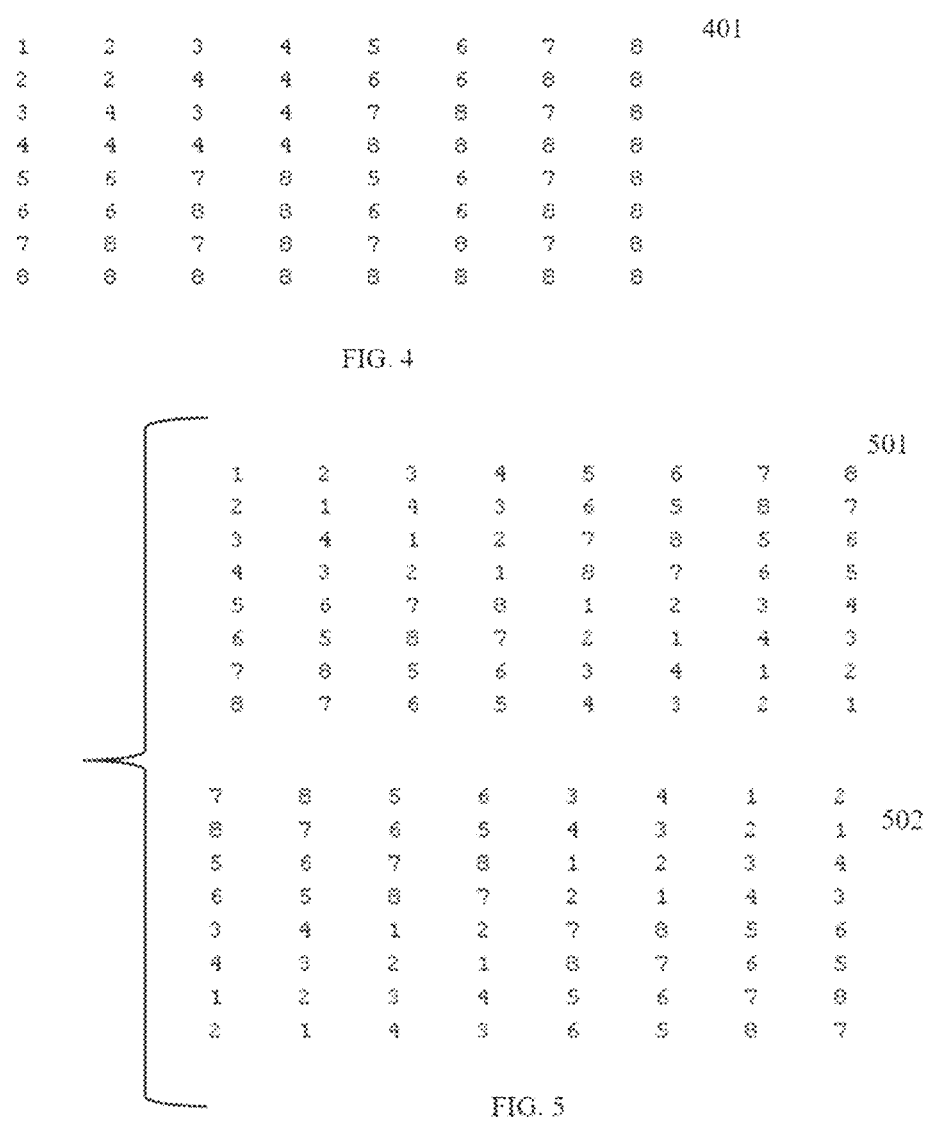

FIG. 3 301 shows a screenshot of a Matlab table of an 8-state multiplication over GF(8). FIG. 4 401 shows a screenshot of an FLTed version of this 8-state multiplication with zero-element 8 and 1-element 1 in origin-1.

The effect of the device of FIG. 1 is that de addition and multiplication over GF(n) are modified in such a manner that the new operations also define a finite field which is called aGF(n). As an illustrative example a modification of a finite field GF(8) with 8-state inverter inv8:[0 1 2 3 4 5 6 7]→[2 3 4 5 6 7 0 1] and reversing inverter rinv8::[0 1 2 3 4 5 6 7]→[6 7 0 1 2 3 4 5] is provided. FIG. 5 shows switching table 501 of sc8, sc8 being the decimal representation of XORing 3-bit words, or XOR8, as stored in memory and display on a screen of which FIG. 5 is a screen shot. The processor is controlled by Matlab® and all output matrices are in origin 1. To interpret 8-state table switching 501 in elements [0 1 2 3 4 5 6 7] a number 1 should be subtracted from the table elements. One can see that 0 (displayed as 1) is the zero element of sc8. As a reminder: a modified addition over aGF(n) continues to have the properties of an addition and a modified multiplication over aGF(n) continues to have the properties of a multiplication, be it with possibly different zero- and one- or neutral elements.

The 8-state switching table 502 in FIG. 5 shows a screenshot of the FLTed switching table 5010 in origin 1. One can see that the element 7 in origin-1 is the zero element of switching table 502. One can test some of the finite field properties of aGF(8) (associativity and distributivity). FIG. 6 provides a screenshot 1000 of the Matlab program that configures and enables the processor to realize the device of FIG. 1 in this 8-state example.

All operations that can be performed over a finite field GF(n) can be performed over the alternate finite field aGF(n). Furthermore, a modified addition of the alternate field GF(n=$2^p$) is also the subtraction over the alternate finite field. In accordance with an aspect of the present invention the properties of the alternate finite field aGF(n) are kept confidential. For instance a cryptographic method applies one or more additions and/or multiplications over a standard finite field GF(n). A standard finite field GF(n) has as zero element for the addition 'scn' and the multiplication 'mn' the element 0. Thus scn(ak,0)=ak and mn(ak,0)=0 and the one element of the multiplication is 1 and thus mn(ak,1)=ak over a standard finite field. From the previous 8-state example it should be clear that sc8i(ak,6)=ak and m8i(ak,6)=6, while m8i(ak,7)=ak. So, an alternate finite field may be characterized by its zero element not being 0 and its one element not being 1.

A general n-state Lab-transform for an n-state switching table is provided in accordance with an aspect of the present invention in in screenshot in FIG. 6 a general Matlab function labtransform (table,invert). A processor executing the instructions of this function is provided with an n by n n-state switching table 'table' and an n-state inverter 'invert.' Lines 10 and 11 determine 'n' from the dimensions of 'table.' Lines 18-21 determine the reversing (to identity) inverter of 'invert.' Lines 24-31 perform the Lab-transform and the Lab-transformed table 'tableinv' is outputted in line 32.

It has been shown in detail by the inventor in U.S. patent application Ser. No. 15/442,556 (hereinafter the "556 application," which is incorporated herein by reference) how the Lab-transform is applied.

It is convenient to describe computer operations in terms of mathematics. This is a bit deceptive, as computer by themselves do not perform "mathematics", they merely process Low and High signals. By managing input and output representation, it may seem to an uneducated user that "mathematics" is performed, but technically speaking it is not. A simple example is bitwise XORing of words of bits by physical XOR devices. Theoretically, one may say, and this is often done as a shortcut, that bitwise XORing words of k-bits is the same as doing an addition over GF(n=$2^k$). And thus one may say: instruct the computer to do an addition over GF(n=$2^k$). However, one now realized that this requires the use of k XOR devices or k times the use of an XOR device and then perhaps representing a word of k bits as a decimal number. But in general a decimal number does not exist inside a computer. It is merely a character that is displayed or printed based on a binary word. One should keep in mind that all operations as described herein, even if mathematical terms and concepts are used, are generally binary operations performed on signals and not mathematical concepts, which at this time cannot be generated by machines.

One application of the Lab-transform in cryptography in accordance with one or more aspects of the present invention is to obfuscate a cryptographic operation to unauthorized machines or users. Even if a basic flow of operations is known, such as in published and standardized cryptographic operations such as AES and public key exchange and Elliptic Curve Cryptography and message-digests or hash functions then the use of "unknown" or Lab-transformed functions in known basic flow processes will render a result very hard to predict. One reason for that is the enormous number of Lab-transforms, which is factorial n or close to factorial n. A 256-state switching function has over $10^{400}$ possible Lab-transformed versions.

It is beneficial to have more than one base n-state function or combination of base n-state switching functions to further obfuscate the result of a Lab-transformed cryptographic operation.

It turns out that different, currently believed to be not used, single or combinations of n-state functions exist that represent an n-state finite field and that can be Lab-transformed. There may be different ways to generate and evaluate different n-state switching functions. In accordance with an embodiment of the present invention, a computer program such as a Matlab program is used to generate all possible commutative n-state switching tables that are similar to n-state switching tables that represent addition-like and multiplication like switching tables. In one embodiment of the present invention an n-state addition-like switching table is an n by n switching table with as zero element the element 0. That is, if the n-state switching table is represented as scn then scn(0,0)=0; scn(a,a$^{-1}$)=a and scn(a,a$^{-1}$) =0, wherein a$^{-1}$ is the additive n-state inverse of a. Without too many details one may represent as an illustrative 5-state example the following partial 5-state switching table:

| sc5 | 0 | 1 | 2 | 3 | 4 |
|---|---|---|---|---|---|
| 0 | 0 | 1 | 2 | 3 | 4 |
| 1 | 1 | c11 | c12 | c13 | c14 |
| 2 | 2 | | c22 | c23 | c24 |
| 3 | 3 | | | c33 | c34 |
| 4 | 4 | | | | c44 |

The above 5-state table is commutative and the "unfilled" elements mirror around the diagonal. In fact, in this example one has to find the elements c11, c12, c13, c14, c22, c23, c24, c33, c34 and c44 all from the set set5=[0, 1, 2, 3, 4]. The selected elements (and their mirrors) should create rows and columns that are reversible 5-state inverters and such that each element of the set set5 only appears once in each row and column. From that only those tables are selected that are associative. It turns out that there are 6 such 5-state tables of which one is the mod-5 addition. It also turns out that these tables can be formed from Lab-transforming the 5-state mod-5 addition with all possible reversible 5-state inverters wherein the 0 and 1 element are unchanged or [0 1 2 3 4]→[0 1 a b c] wherein a, b and c each are different elements of [2, 3 4]. This offers 6 different tables for additions. Running a Matlab program that generates all unique different commutative and associative 5-state tables provides the same 5-state switching tables.

In a next step in accordance with an aspect of the present invention one generates different 5-state multiplication-like switching tables that are commutative and associative and that have 0-element 0 and 1-element 1. Call these tables m5. This mean that m5(a,0)=0; ma5(a,1)=a and ma5(a,a$^{-1}$)=1. The element a$^{-1}$ in this case is the multiplicative inverse of a. As an example the 5-state prototype multiplicative switching table looks like the following table

| m5 | 0 | 1 | 2 | 3 | 4 |
|---|---|---|---|---|---|
| 0 | 0 | 0 | 0 | 0 | 0 |
| 1 | 0 | 1 | 2 | 3 | 4 |
| 2 | 0 | 2 | c22 | c23 | c24 |
| 3 | 0 | 3 | | c33 | c34 |
| 4 | 0 | 4 | | | c44 |

In an illustrative example there are actually two 5-state base multiplication switching tables: a first one is the modulo-5 multiplication and the other is the 5-state consecutive multiplication, which is shown in the following table as m5c.

| m5c | 0 | 1 | 2 | 3 | 4 |
|---|---|---|---|---|---|
| 0 | 0 | 0 | 0 | 0 | 0 |
| 1 | 0 | 1 | 2 | 3 | 4 |
| 2 | 0 | 2 | 3 | 4 | 1 |
| 3 | 0 | 3 | 4 | 1 | 2 |
| 4 | 0 | 4 | 1 | 2 | 3 |

It turns out that the Matlab program generates one 5-state switching table that cannot be generated by Lab-transforming a base (5-state consecutive or modulo-5) multiplication. That table is m5new, shown below.

| m5new | 0 | 1 | 2 | 3 | 4 |
|---|---|---|---|---|---|
| 0 | 0 | 0 | 0 | 0 | 0 |
| 1 | 0 | 1 | 2 | 3 | 4 |
| 2 | 0 | 2 | 1 | 4 | 3 |
| 3 | 0 | 3 | 4 | 1 | 2 |
| 4 | 0 | 4 | 3 | 2 | 1 |

The table m5new is associative. Using this switching table as a base will generate all the same switching tables by using the above inverters with the Lab-transform. This table thus is Lab-transform invariant. Multiplication-like n-state switching functions wherein an element has itself as multiplicative inverse may not be useful in cryptography wherein powers of generator terms are determined. Each power in that case is either 1 or itself. Thus, one should evaluate those n-state switching tables for such an occurrence. However, these self-inversions may be useful in other encryption operations or in error-correcting codes. The availability of this type of functions can be shown to be enabled in not only n-state switching 'multiplication' switching tables with n being prime but also for numbers that are powers of prime numbers.

Furthermore, it is possible to create 'designer' switching tables that meet certain requirements. For instance, the n-state consecutive multiplication has a regular pattern for the location of the symbol 1, which determines the multiplicative inverse of a switching table mn, as $mn(a,a^{-1})1$. The symbol 1 has a fixed place in the n-state consecutive multiplication table. This enables a simple determination of a multiplicative inverse. Below, as an illustrative example, the 9-state consecutive multiplication table is provided. The multiplicative inverse herein follows a defined pattern.

| mncon | 0 | 1 | 2 | 3 | 4 | 5 | 6 | 7 | 8 | mn mod | 0 | 1 | 2 | 3 | 4 | 5 | 6 | 7 | 8 |
|---|---|---|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 | 0 | 0 | 0 |
| 1 | 0 | 1 | 2 | 3 | 4 | 5 | 6 | 7 | 8 | 0 | 0 | 1 | 2 | 3 | 4 | 5 | 6 | 7 | 8 |
| 2 | 0 | 2 | 3 | 4 | 5 | 6 | 7 | 8 | 1 | 0 | 0 | 2 | 3 | 8 | 7 | 6 | 1 | 5 | 4 |
| 3 | 0 | 3 | 4 | 5 | 6 | 7 | 8 | 1 | 2 | 0 | 0 | 3 | 8 | 4 | 5 | 1 | 2 | 6 | 7 |
| 4 | 0 | 4 | 5 | 6 | 7 | 8 | 1 | 2 | 3 | 0 | 0 | 4 | 7 | 5 | 1 | 3 | 8 | 2 | 6 |
| 5 | 0 | 5 | 6 | 7 | 8 | 1 | 2 | 3 | 4 | 0 | 0 | 5 | 6 | 1 | 3 | 4 | 7 | 8 | 2 |
| 6 | 0 | 6 | 7 | 8 | 1 | 2 | 3 | 4 | 5 | 0 | 0 | 6 | 1 | 2 | 8 | 7 | 5 | 4 | 3 |
| 7 | 0 | 7 | 8 | 1 | 2 | 3 | 4 | 5 | 6 | 0 | 0 | 7 | 5 | 6 | 2 | 8 | 4 | 3 | 1 |
| 8 | 0 | 8 | 1 | 2 | 3 | 4 | 5 | 6 | 7 | 0 | 0 | 8 | 4 | 7 | 6 | 2 | 3 | 1 | 5 |

The switching table of the consecutive multiplicative switching table 'mncon' has multiplicative inverse 1s located on diagonal that rises when the column number increases. Rather than calculating the location of 1 in the table using for instance the extended Euclidean algorithm one can determine the location of 1 (and thus of the multiplicative inverse) based on the row or column number of a symbol. One can design a desired n-state switching table with any diagonal of 1s at least when n is prime or a power of a prime number. In mnmod above for n=9 the diagonal of 1s starts at (6,2) moves to (5,3) to the top at (2,6) and re-starts at the bottom (8,7) up to (7,7). A similar 8-state multiplicative switching table can be found of which an example m8mod is shown below. With the 1 diagonal starting at the bottom of the $2^{nd}$ column and going upward to (2,7).

| m8 mod | 0 | 1 | 2 | 3 | 4 | 5 | 6 | 7 |
|---|---|---|---|---|---|---|---|---|
| 0 | 0 | 0 | 0 | 0 | 0 | 0 | 0 | 0 |
| 1 | 0 | 1 | 2 | 3 | 4 | 5 | 6 | 7 |
| 2 | 0 | 2 | 6 | 7 | 3 | 4 | 5 | 1 |
| 3 | 0 | 3 | 7 | 5 | 6 | 2 | 1 | 4 |
| 4 | 0 | 4 | 3 | 6 | 2 | 1 | 7 | 5 |
| 5 | 0 | 5 | 4 | 2 | 1 | 7 | 3 | 6 |
| 6 | 0 | 6 | 5 | 1 | 7 | 3 | 4 | 2 |
| 7 | 0 | 7 | 1 | 4 | 5 | 6 | 2 | 3 |

Another unexpected result is that there are at least 2 finite fields defined by one n-state multiplicative associative switching table. A first finite field is defined by for instance in 'n is prime' case by a mod-n multiplication switching table and a mod-n addition table. Unexpectedly there is at least one other "addition" that combined with the same multiplicative switching table defines a finite field GF(n). The following switching tables illustrate this for a 7-state case.

| m7 | 0 | 1 | 2 | 3 | 4 | 5 | 6 | sc7a | 0 | 1 | 2 | 3 | 4 | 5 | 6 | sc7b | 0 | 1 | 2 | 3 | 4 | 5 | 6 |
|----|---|---|---|---|---|---|---|------|---|---|---|---|---|---|---|------|---|---|---|---|---|---|---|
| 0 | 0 | 0 | 0 | 0 | 0 | 0 | 0 | 0 | 0 | 1 | 2 | 3 | 4 | 5 | 6 | 6 | 0 | 1 | 2 | 3 | 4 | 5 | 6 |
| 1 | 0 | 1 | 2 | 3 | 4 | 5 | 6 | 6 | 1 | 2 | 5 | 4 | 0 | 6 | 3 | 3 | 1 | 6 | 5 | 2 | 0 | 4 | 3 |
| 2 | 0 | 2 | 6 | 5 | 3 | 4 | 1 | 4 | 2 | 5 | 6 | 0 | 1 | 3 | 4 | 4 | 2 | 5 | 1 | 0 | 3 | 6 | 4 |
| 3 | 0 | 3 | 5 | 6 | 2 | 1 | 4 | 4 | 3 | 4 | 0 | 5 | 6 | 1 | 2 | 2 | 3 | 2 | 0 | 4 | 6 | 1 | 5 |
| 4 | 0 | 4 | 3 | 2 | 1 | 6 | 5 | 5 | 4 | 0 | 1 | 6 | 3 | 2 | 5 | 5 | 4 | 0 | 3 | 6 | 5 | 2 | 1 |
| 5 | 0 | 5 | 4 | 1 | 6 | 2 | 3 | 3 | 5 | 6 | 3 | 1 | 2 | 4 | 0 | 0 | 5 | 4 | 6 | 1 | 2 | 3 | 0 |
| 6 | 0 | 6 | 1 | 4 | 5 | 3 | 2 | 2 | 6 | 3 | 4 | 2 | 5 | 0 | 1 | 1 | 6 | 3 | 4 | 5 | 1 | 0 | 2 |

This unexpected result is caused by in this case by a 7-state self-reversing inverter, represented by [0 1 2 3 4 5 6]→[0 1 6 5 4 3 2]. A Lab-transform of table sc7a based on this inverter creates sc7b, but a Lab-transform of m7 with this inverter leaves m7 unchanged. Almost every associative n-state 'multiplicative' switching table is invariant under a Lab-transform based on at least one n-state reversible inverter, while a corresponding n-state 'additive' n-state switching table is not. Thus when a combination of such an 'additive' and 'multiplicative' n-state switching table define a finite field GF(n), then their above Lab-transformed tables, of which one remains unchanged under certain inverters also define a finite field. For illustrative purposes the symbols 0 and 1 remain unchanged for selected inverters.

It is emphasized (again) that the n-state switching tables that are provided, illustrated and/or used herein are representations of one or more properties of a physical device. The symbols used in the n-state switching tables are a symbolic representation of physical states of a physical device and/or of physical signals. The symbols thus are merely labels that facilitate an understanding of switching behavior. A 0, 1 or 7 or any other symbol merely indicates that they are different from each other. A 0 is not necessarily 0 volt or 0 any other physical entity. It only means that a 0 is assigned to a particular physical state or signal and that it is different from other states or signals being represented by different symbols. States designated with the same symbol are identical states or represent identical or close to identical signals within for instance a certain noise margin. In general a binary "high" signal is represented by a 1 and a "low" binary signal by a 0. Combinations (or words) of bits may be represented by for instance their decimal equivalent. Words may be processed in their entirety as a unit and thus can be represented by a symbol such as a decimal symbol. However, other representations are possible and would be appropriate, such as letters or colors etc. Such representations may not be helpful in analyzing a performance of a switch device represented or characterized by a switching table.

The n-state switching tables implemented on a switching device such as a processor do not perform an arithmetic or mathematical operation, they merely perform a physical switching operation between switching states in which humans provide a meaning.

The 'meaning' of a state is thus provided by its use in a switching table and not by an inherent meaning of a switching state. As explained elsewhere by the inventor, for instance in the 556 application, a state represented by a symbol 0 is not always a zero-element in a 'multiplicative' switching table. Only the state 'z' in an n-state switching table mn for which $mn(z,x)=z$ for all valid states x is the zero element. A switching table that has this property is not and would not be recognized as a valid arithmetical or mathematical operation. Even though terms like addition, multiplication, power of, multiplicative and additive inverse, group field and the like are used herein, it is only applied to enable description and understanding of certain operations. However, all operations herein are physical switching or machine operations and are fully intended to be considered as such.

The Finite Lab-transform (FLT) applies n-state inverters to known primitive operations in cryptographic methods, such as encryption, hash generation and private/public key operations. Primitive computer operations include operations characterized as modulo-n multiplications and operations over finite fields GF(n). Much of the literature assumes that there is only one finite field GF(n) with n a prime greater than 2. [1]. It will be shown that the FLT transforms GF(n), with n being a prime or with n=qp and q being a prime, in another different finite field. The FLT preserves properties such as associativity and distributivity, but may change the one-element and/or the zero-element of an operation. The FLT is achieved by using n-state inverters, which will be explained. An extremely large number of FLT modifications is possible while leaving basic integrity of known cryptographic methods intact, enabling easy and secure modifications of known cryptographic methods.

The instant subject matter, as well as its description, is unusual compared with literature in cryptography. It introduces novel primitive n-state computer functions with n>2. The subject matter falls somewhat between machine arithmetic, which provides machine logic design of arithmetical functions and machine cryptography.

One may question if an n-state switching table implementation has the same status as a combinational circuit. The answer is an unambiguous YES. A computer is a device that generates output on the basis of internal instructions. It does not matter for an output if the signals are generated from stored instructions or from a stored table. For instance, strictly from the output value a person of ordinary skill would be unable to determine if for instance AND functions in the computer are implemented or realized in combinational devices or from memory stored tables. However, the measurable advantage of stored switching tables in certain applications is a much faster processing speed. However, in the correctness of an answer it doesn't matter how a computer operation is physically realized, as long as its logical implementation covers the physical realization. This is explained in Gerrit A. Blaauw, Digital Systems Implementations, Prentice-Hall, Englewood Cliffs, NJ 1976, ("Blaauw") which is incorporated herein by reference.

The subject of switching in terms of arithmetic is often called Computer Arithmetic and is directed to computer operations, not to human operations. In that sense, computer operations and human arithmetic are often confused by non-trained people, as both apply arithmetical or mathematical terms. For instance a popular computer operation in machine cryptography is the addition over $GF(n=2^k)$. It turns in that in spite of the lofty mathematical term, in computer arithmetic it is simple the bitwise XOR of words of k bits. All mathematical terms herein should be interpreted as being computer implemented and not as a human operation.

An aspect of the present invention is use of n-state inverters with n being greater than 2. It is believed that the inventor is the first who introduced and at least applied n-state inverters in machine cryptography. An n-state inverter is a device is an electronic or optical or otherwise physical structure that transforms a signal that has one of n states into another signal having also one the n states. Preferably, at least one signal having one of n states is transformed into a signal having a different state of n possible states. If no transformation takes place, the n-state inverter is Identity which physically may be a direct connection. Unless explicitly stated otherwise, any n-state inverter herein is NOT Identity. An n-state inverter may apply a unique transformation. In that case the n-state inverter is a reversible n-state inverter. One may compute the reversing n-state inverter of a reversible n-state inverter.

An n-state inverter may be characterized by an array of n elements. For instance: invn=array(1,n). That is: array invn has elements with indices running from 0 to n−1 in C and from 1 to n in Matlab. In Matlab the elements are: invn(1), invn(2), . . . invn(n). In C, which applies different notation the elements may be; invn[0], invn[1], . . . , invn[n−1]. For instance a 5-state reversible inverter in Matlab may be presented as inv5=[2 3 4 5 1], which means inv5(1)=2, inv5(2)=3, . . . , inv5(5)=1. A rule for determining the reversing inverter rinv5 would be:

$$
\begin{aligned}
&i=1{:}5 \\
&ind{=}inv5(i); \\
&rinv5(ind){=}i; \\
&end
\end{aligned}
$$

for

This has as result that inv5(rinv5(i))=i, which is a general property of inverters and corresponding reversing reversible n-state inverters. One observation is that for determining rinv5(i) one may have to determine the complete inversion. This may not be a problem for relatively small values for n like n−256. However it is a problem for large values of n, generally for n greater than 100 million, as systems may run out of memory to store the inverters. This may be solved by having rule based inverters, like invn(i)=a*i+b mod-n. One may determine reversing rules. Such as rinv(i)=a$^{-1}$(i−b). However, this also may increase a risk of successful attacks. This issue will be addressed later herein.

The FLT has been explained and addressed by the inventor in several other disclosures such as U.S. patent application Ser. No. 18/097,396 filed Jan. 16, 2023, U.S. patent application Ser. No. 17/402,968 files on Aug. 16, 2021 which are both incorporated herein by reference. One is referred to FIGS. 1 and 2 wherein the FLT is explained.

If one keeps the n-state inverters secret, an additional level of security is provided in the order of at least (n−5)! (factorial of (n−5)) which for n=256 is a factor d=greater than $10^{400}$. And all in a relatively very simple manner by FLTing basic n-state computer operations. The change compared to for instance using Post Quantum (PQ) methods is small with an improvement that provides security that may be equivalent or better than published PQ methods.

The use of stored tables instead of computing bitwise XORing makes programs faster. Other implementation methods can improve the speed of these applications. There are several new technologies that can speed up computation without negatively affecting security. For instance one may apply special instruction sets available in AES-NI (Advanced Encryption Standard New Instructions) by Intel for instance as described on https://www.intel.com/content/www/us/en/developer/articles/technical/advanced-encryption-standard-instructions-aes-ni.html which is incorporated herein by reference. These and other instruction sets may provide hardware acceleration of cryptographic methods, such as encryption, hashing and public key exchange methods such as Diffie-Hellman and RSA and others. Accelerations by a factor 10 may be reached over standard compiled implementations. In a similar way aspects of the FLT may be accelerated, especially the implementation of n-state inverters and the computation and use of stored tables. In fact, standard implementations of cryptography such as encryption like GCM-AES and ChaCha20 as well as hashing with MD5 and SHA256 work close to as fast or faster in FLT transformation as in unchanged configuration. This may be achieved by using stored tables for instance for additions over GF(256). Even so, the use of n-state inverters in the entire scheme of encryption and/or hashing does not seem to significantly slow-down the performance.

Accordingly, FLTed machine cryptography is strictly intended to work on computer machines. It is not intended, nor is it close to being practical for application by the human mind even with help by pencil and paper. The application is in file and/or data transfer between two computing devices, preferably connected through a network or via other forms of signal transfer, electronic, magnetic and/or optical and/or quantum mechanical. Practical limits would be that the FLTed machine cryptography is applied to data messages or data files equivalent to at least 1000 bytes, with n-state machine processing with n being at least 14, wherein the retrieval or generation, the creation or retrieval of the FLTed switching function, the encryption or decryption and/or hashing of the data with the FLTed method, which preferably is a standard or at least previously published method, is performed within 60 seconds and the result is generated in electrical or optical or electro-magnetic form that may be received and transmitted over a network, preferably a wireless network, the Internet, the telephone network, a galvanic connection, an Ethernet connection or more generally any network that is enabled to transmit data signals.

Practically it was proven by the inventor that a file of up to 100 MB was processed as above by a 3 GHz processor within 60 seconds in Matlab and at least an order of magnitude faster in a non-optimized (textbook) compiled C program. This was an over 100 MB.mp4 file that was encrypted/decrypted with FLTed GCM-AES, ChaCha20 and a custom FLTed maximum length 256 state sequence and FLTed MD5 and FLTed SHA256, all well below 15 seconds on a Dell Inspiron 660 computer with an Intel Core i3-3240, 3.4 GHz and 8 GB memory in compiled C under 64 bits Windows 10. There is of course no human who can make this work manually and it would make practical secure Internet traffic unpractical and impossible if humans had to do the machine cryptography. Furthermore, machine cryptography methods as known have what is called the avalanche effect. That is, a small change in original data provides a significant change in the output. Even at a small size such as 1000 bytes, making a small error in a slow and cumbersome manual process would be easy to make. In developing the software the inventor has often manually applied the FLT methods and found that at even 100 bytes an error would easily slip in, making the whole manual process moot, because for decryption and re-hashing a particular error would not be replicated but other errors may be introduced, making validating by hashing as well decryption by hand an entirely moot and futile process.

Furthermore, apart from the application in cryptography, the FLT is a new form of machine functionality that is novel and non-obvious.

The FLT may be implemented in several ways, even in modified ways. Limitations of implementations are conditioned by the functions as well the application and the size of n.

For instance for n=256, each state requires 8 bits or a byte to be represented. A 256-state inverter would thus require n=256 bytes, and the reversing inverter would require the same, which is doable. A 256 by 256 switching tables of bytes requires 64 KB, which is also doable. The situation changes if $n=2^{16}$ or n=65,536. This requires 16*65,536 bits for a n-state inverter. This is still not much in memory, 1 MB and the same for the reversing inverter. However, a 65,536 state switching table requires a $2^{20}*2^{20}=1,000,000$ MB. While it is practical to generate and store the n-state inverters, it is not practical to store the equivalent switching table. It seems for $n=2^{11}$ or even $n=2^{12}$ one may practically store inverters and perhaps switching tables. However for $2^k>2^{13}$ table storage of the n-state switching table becomes unpractical.

For $n=2^{32}$, or 32-bit word inverters, both storage of inverters as well as storage of the related switching table becomes unpractical and some sort of rule based inverter is required.

A useful concept for the following is the "sum-space." The sum-space is the totality of results of reversible functions such as the addition modulo-n or addition over $GF(n=2^k)$ or of any reversible function c=scn(a,b). The sum-space is formed by applying all possible combinations (a,b) and then looking at the totally of outcomes c=scn(a,b). The sum-space of all reversible operations is a uniform distribution of c over all possible outcomes. This is beneficial for cryptographic applications as one does not have a bias towards an input combination.

The sum-space of an FLTed reversible function is also uniform and shows no bias towards a combination of input operands.

Commonly, carry-free n-state reversible functions are applied in cryptography. For example in AES-GCM encryption a ciphertext is generated by bitwise XORing a bitstream of cleartext with a bitstream of keywords generated by AES as disclosed in both NIST FIPS-197 and NIST Special Publication 800-38D, Recommendation for Block Cipher Modes of Operation: Galois/Counter Mode (GCM). which are both incorporated herein by reference. A similar approach is applied in encryption by ChaCha20 where key words of 32 bits are bitwise XORed with words of 32 bits in cleartext. One may consider words of k bits also as $n=2^k$ state symbols and perform addition over $GF(2^k)$ and generate $n=2^k$ state symbols which may be represented by k bits. In that case bitwise XORing of k bits is equivalent with addition over $GF(2^k)$ as for instance explained in the literature and textbooks. Similarly, bitwise XORing of words of bits is used internally in AES, for instance in the AddKeyRound( ) step where 16 bytes state-arrays are processed by bitwise XORing. Similarly, quarter-rounds in ChaCha20 perform bitwise XORing of words of 32-bits selected from a 64-byte state array. AES also applies XORing in other parts of its operations. In ChaCha20 also a modulo-$2^{32}$ addition is performed on words of 32-bits. In that case the binary words are added radix-2. That means a 2-state ripple adder or equivalent process is applied wherein both XOR (mod-2 addition) and a related carry are applied in a radix-2 ripple adder scheme. The mod-$2^{32}$ means that the max output is 32 bits being 1 and all higher outcomes are represented mod-$2^{32}$.

A benefit from a radix-n addition is that it, for instance when represented as an n-state ripple adder, is a combination of first performing a mod-n addition to generate a residue mod-n, followed by an n-state carry determination for a radix-n position next to the position of the n-state elements from which it is determined. Commonly, the radix-n computation takes place from right to left for arithmetical reasons. For cryptographic reason one may also perform from left to right. Each carry digit in combination with a residue may form a new carry digit in a next adjacent position. Hence one needs for radix-n addition of two words of k n-state digits k cycles to make sure there are no more carry digits and the carry ripples, as it were, through the intermediate sums. The sums of radix-n addition of 2 words of k n-state elements are different from mod-n addition of 2 words of k n-state elements. This difference in outcome is welcome in further and different mixing of words of k n-state elements as in ChaCha20 for instance.

Unfortunately, machine arithmetic applies known (or canonical) rules for the ripple adder. That rule generally is: residue (ak+bk) mod-n and carry is 1 when ak+bk>n−1, otherwise it is 0. The reason for that is basically a reason for arithmetic, because the outcome of the addition in standard application must make arithmetical sense. Furthermore, one in generally expects that the entire operation is reversible, mostly with a radix-n subtraction. Reversibility of a radix-n addition with an n-state carry is in fact a radix-n subtraction with an n-state borrow. The inventor has explained in detail how to create invertible radix-n additions and subtractions in U.S. Provisional Application Ser. No. 63/548,184 ("184 spec") filed on Nov. 11, 2023 and Provisional Application Ser. No. 63/553,456 ("456 spec") filed on Feb. 14, 2024, which are both incorporated herein by reference.

It is explained in the 184 and 456 spec how one may structure a canonical radix-n addition of words of k n-state elements for any n and any k. Radix-n addition herein means a carry ripple addition of words of at least 2 n-state elements and includes a carry function. The same applies for radix-n subtraction which has as operands 2 words of at least 2 n-state elements and a related borrow function, wherein the radix-n operation reverses the radix-n addition or the radix-n addition reverses the radix-n subtraction. For cryptographic reasons there is no such meaning as addition and subtraction, but only modification of operands which in certain cases may be invertible or reversible. For that reason, herein the term radix-n operation is used. Radix-n operation thus means an operation on 2 words or operands of 2 or more n-state elements with n preferably being 2 or greater and more preferably being greater than 2. The radix-n operation includes 2 separate n-state functions that operate on corresponding pairs of n-state elements. The first n-state function is a reversible n-state operation. An n-state function is reversible when all columns and rows in its 2 by 2 representation switching tables are reversible n-state inverters. All reversible n-state functions have a uniform sum-space.

The second n-state function in a radix-n operation is an n-state transition function (in arithmetical terms an n-state carry or borrow) and operates also on 2 corresponding n-state elements in input operands and generates an n-state transition element. While the result of the reversible n-state operation is placed in a position corresponding to a position of the input elements in an operand. The n-state transition function in an arithmetical operation falls with narrow conditions, usually being 0 or 1. It also places its result in an adjacent position relative to the position of the input elements in an operand word. For non-arithmetical operations such as cryptographic operations as disclosed herein such conditions are not imposed.

The inventor explained in the 184 and 456 spec a structure of canonical reversible radix-n operations, using additions modulo-n and additions over $GF(2^k)$ or their inverses as n-state reversible functions and creating corresponding n-state transition functions. This allows modifying for instance a final stage of an AES-GCM encryption. For instance while still using bitwise XORing, one may treat a word of k bits as an n-state symbol with $n=2^k$ and use p n-state symbols with p>1 and preferably p>2 as size of a word with p n-state elements and perform a radix-n operation using for instance addition $GF(2^k)$ as the reversible (and self-reversing) operation in combination with an appropriate n-state transition function. In reversing mode one should adapt the transition function.

In accordance with an aspect of the present invention, there is no concern about a radix-n operation being reversible. The radix-n operation on two words of k n-state elements has a sum-space which is uniform or flat. Which means that there is no bias towards any outcome. This means that as long as there is a reversible n-state function applied in the radix-n operation, it does not matter the sum-space what the transition elements are. The sum-space is uniform or flat, no matter what the n-state carry or borrow function is. Preferably, the n-state n by n table, which may be called the transition table or transition array, may be completely random and will not change the overall sumspace. However, one should realize that this affects reversibility of the radix-n operation.

How may one use this beneficially in cryptographic machines? It should be clear that using a radix-n operation on words of k n-state elements provides (by use of n-state transition elements) a different outcome compared to using only n-state reversible functions without transitions. Actually, the use of standard modulo addition in cryptography is well known. As was mentioned ChaCha20 applies modulo-$2^32$ addition in its quarter-rounds. Also SHA-256 and other hashing methods apply modulo addition. However, as was explained, traditionally one uses an addition that is based on standard arithmetic and not on modified machine operations. Traditional arithmetic, also when implemented in machine arithmetic, is very predictable. It provides a predictable modification of operands that are kept secret. The modification as provided herein ensures a secret and unpredictable modification. Because its sum-space is the same as an unmodified operation, it is unclear to an attacker if and where a secret modification has been applied as a generated ciphertext has a valid appearance with no detectable bias.

The basic approach is as follows. Where an operation on multiple bits is performed, first a stream of bits is re-ordered into basic chucks of k bits. So for instance, a series of 32 bit may be addressed as a word of 4 n-state elements each represented by 8 bits or a $n=2^8=256$ or 256-state elements. Thus a series of 32 bits may be considered to be a word of 4 256-state elements. And the combining of 2 words of 4 256-state elements may be performed by a radix-256 operation. Often a combination of 2 words of 32 bits is a straightforward bitwise XORing. In accordance with an aspect of the present invention, this is modified into a radix-256 operation on 2 words of 4 256-state elements with transition, for which the 256-state transition array is seemingly random. Preferably, one does not use a canonical transition array, as explained in the 184 and 456 spec, but rather a random looking transition array.

The standard or canonical transition array for a modulo-n addition is of the form $carn(i1,i2)=(i1+i2>n-1)$. Or, in origin 0, when a sum of 2 input operands is smaller than n the transition element is 0 and when the sum is greater than n−1 the transition element is 1. For n=4 the transition array is the carry for a modulo-4 addition, or car4=[0 0 0 0; 0 0 0 1; 0 0 1 1; 0 11 1]. The borrow corresponding to the mod-4 subtraction is the flipped versions of car4 or bor4=[0 1 1 1; 0 0 1 1; 0 0 0 1; 0 0 0 0]. This shape or from applies actually to all carry and borrow digits modulo-n and is like car_n=[0 0 0 . . . 0 0 0; 0 0 0 . . . 0 0 1; 0 0 0 . . . 0 11; . . . ; 011 . . . 111] and a corresponding borrow is a flipped version of carn as in born=[0 1 1 . . . 1 1 1; . . . ; 0 0 0 . . . 0 1 1; 0 0 0 . . . 0 0 1; 0 0 0 . . . 0 0 0]. In accordance with an aspect of the present invention, one may actually modify the canonical n-state carry function/table by changing 0 to another n-state symbol and 1 yet to another one.

One may modify the transition table with an FLT. For instance using a 5-state canonical carry table car5=[0 0 0 0 0; 0 0 0 0 1; 0 0 0 1 1; 0 0 1 1 1; 0 1 1 1 1] and apply the FLT as shown in Matlab computer screen capture 600 in FIG. 6 using inv5=[3 4 0 1 2] one gets as modified car5f=[3 3 2 2 3; 3 3 2 3 3; 2 2 2 2 2; 2 3 2 2 2; 3 3 2 2 2]. This does no longer look like the canonical form of the carry or transition function/table. However, the distribution of modified zero elements (now 2) and one elements (now 3) remains the same. In accordance with an aspect of the present invention, one may change a canonical n-state transition function/table (be it the carry or the borrow) into a non-canonical one, by applying an n-state FLT using an n-state inverter that is not identity.

Figure 9:
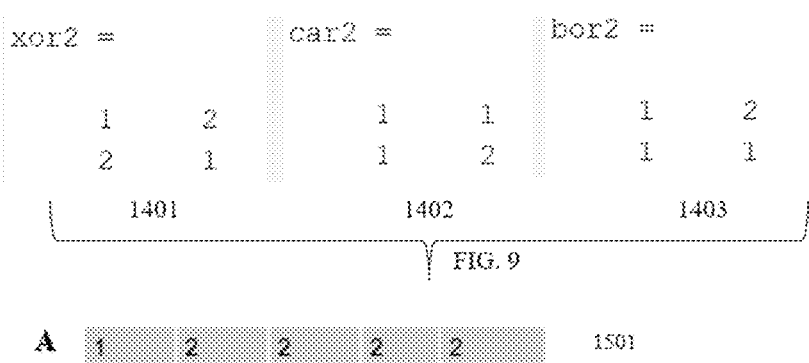
FIG. 9 are screenshots of 2-state computer operations.

There is a second set of canonical n-state carry and borrow functions that create a reversible radix-n addition for $n=2^k$. This corresponds to a different reversible operation. The earlier canonical n-state function/table corresponds to a modulo-n addition. The one provided next corresponds to an extension or power of a base operation. One of the most widely operations in cryptography is the XOR operation, which may be represented by the modulo-2 operation. The switching table XOR2 in Matlab origin-1 is illustrated as a screenshot in 1401 of FIG. 9, with a corresponding carry function/table car2 1402 which is as device an AND gate and 1403 a corresponding borrow table bor2, keeping in mind that addition mod-2 and subtraction mod-2 are identical functions and are called an involution. The following may be applied to any extension for $n=p^k$ with p a prime number. However, p=2 is by far the most widely used computer function for this purpose. One should also keep in mind that for arithmetical purposes one generally does not apply subtraction but rather the 2s complement addition.

The addition $GF(n=2^k)$ is a bitwise XORing of 2 words of k bits, which generates also a set of k bits and the k bits are represented by their decimal value, for instance. The inventor has created a computer program (in this case in Matlab) shown as Matlab screenshot in FIG. 18 that creates the bitwise execution and decimal representation of a function funbase by funn=elemtabn(dec,k,funbase,base). Herein funn is the decimal table representation of an elementwise application of a base function funbase applying a base to a word of k base-state elements into a table of dec-state elements. For instance, using base=2, funbase=xor2, k=2 and dec=4 (using Matlab origin-1) one gets sc4=[1 2 3 4; 2 1 4 3; 3 4 1 2; 4 3 2 1] in origin-1, which is of course an addition over GF(4).

Similarly one may create the 4-state carry corresponding to sc4 which is reversible by car4=elemtabn(4,2, and 2,2) with car4=[1 1 1 1; 1 2 1 2; 1 1 3 3; 1 2 3 4] in origin-1. So the carry free addition over GF($2^k$) has been modified into a reversible radix-n=$2^k$ operation with carry. The canonical form of the borrow is the flipped version of car4 or bor4=[1 2 3 4; 11 3 3; 1 2 1 2; 1 1 1 1], which one may also compute with bor4=elemtabn(4,2, bor2,2). One may apply the same approach for higher values like radix-8 or radix-256 or higher. For n=8 one gets car8=elemtabn(8,3, car2,2) as 8=$2^3$ with results: car8=[1 1 1 1 1 1 1 1; 1 2 1 2 1 2 1 2; 1 1 3 3 1 1 3 3; 1 2 3 4 1 2 3 4; 1 1 1 1 5 5 5 5; 1 2 1 2 5 6 5 6; 1 1 3 3 5 5 7 7; 1 2 3 4 5 6 7 8]. While there are certain patterns, these patterns may differ as n increases. However, 2 patterns are the same: all carry (and borrow) functions/ tables for n=$2^k$ have a row/column that has only zero elements and one row that is identity. Which means that both the n-state carry/borrow canonical transition tables for n being prime and for n=$2^k$ have a row/column that has only zero-elements. Thus a transition table that has no column and/or row only being zero elements is NOT-CANONICAL.

For cryptographic reasons a radix-n operation with a transitional table that has a row and/or column of only zero-elements is less secure, because the reversible n-state operation of the radix-n operation is now transition free and at least may be somewhat open to attack. For that reason an n-state transitional table in a radix-n operation preferably is non-canonical and preferably has no more than n/2 zero-elements in a row and/or column of its switching table. One is reminded that the zero-element is determined by the reversible switching function of the radix-n operation. Too many zero-elements again may offer an opportunity for attacks. For that reason preferably on should generate a transitional table that has less than n zero-elements and preferably one makes sure that under the above condition no row and/or column has no more than n/2 or less than n/2 zero elements in a row and or column. Preferably, no row and or column has more than 2 consecutive zero elements.

Because one does not require in certain cases the radix-n operation to be reversible, a workable requirement may be to generate a random n-state transitional table/function with each element having an expectation of an 1/n expected occurrence. Another criterion for qualifying an n by n array of n-state elements is that the n by n array of n-state elements in combination with a reversible n-state operation configures or establishes a radix-n operation that is not reversible. A radix-n operation that includes an n-state reversible operation and an n-state transition function/table is not reversible or non-reversible when the radix-n operation of two words of two or more n-state elements each is not reversible for at least one set of two words. For instance the operation may be reversible for one set of 2 words, but not for another one. In that case the radix-n operation is explicitly called non-reversible or "not reversible" herein.

FIG. 10 1501 illustrates a full radix-2 addition for 2 words of 4 2-state elements using reversible function 1401 (or XOR) and carry 1402. The operands A and B are words A=[2 2 2 2] and B=[1 11 2], all in origin-1. A and B are selected so a maximum ripple of the carry is created. The small 'r' indicate the residue generate from the XOR of 2-state elements in that position. The small 'c' indicates the carry element in a position created by the carry function and 2 (1402) on elements in a prior position. The operation in the example of FIG. 10 takes place from right to left. In the classical situation the last (or starting position of the carry operation) is empty, because there are no elements to determine a carry from. Or one may say that the carry in that position is always a zero-element. Both conditions i.e. moving from right to left as well as start with zero-element carry are arbitrary. One may start where desired. One may also assume that there are two (invisible) elements that are not zero-elements in the $5^{th}$ element position. This means that there may be a non-zero element carry on a start position. For cryptography application one may assume that the carry-out and the resulting residue is lost and is not included in the computed sum D. Thus, while the bitwise XOR of A and B would be [2 2 2 1], the radix-2 result as illustrated is [1 1 1 1].

FIG. 11 illustrates the recovery of A from the result D which may be called a ciphertext and B which may be called a key by radix-2 subtraction of B from D, using again XOR (which is an involution) and bor2 as the 2-state borrow function, in table 1601. Again the borrow out is ignored and one recovers A=[2 2 2 2]

FIG. 14 illustrates addition modulo-4 sc4 and subtraction modulo-4 min4 in a Matlab screenshot in origin-1. FIG. 15 illustrates the carry and borrow functions related to the functions of FIG. 14. FIG. 16 illustrates a canonical 4-state carry function related to addition over GF(4) which in combination forms a reversible radix-4 operation. FIG. 17 further illustrates the canonical 8-state carry function corresponding in Matlab screenshot corresponding to the addition over GF(8).

A similar process may be applied to any radix-n operation using the correct reversible n-state function and the desired n-state transitional function. As explained above, a radix-n operation with an n-state reversible operation always has a uniform sum-space no matter the applied transitional function. Not all radix-n operations are reversible. However, as explained above, reversibility of the radix-n operation may not be needed, as in cryptography operations such as AES-GCM, ChaCha20 and/or hashing such as SHA-256.

FIG. 12 is a screenshot of a Matlab program that performs a radix-n operation on a word of 'tele' rad-state elements with as input operands word 'inn' and 'keyn' and with reversible rad-state operation 'addn' and transitional array 'carn.' The term 'invn' is to further modify with an FLT, but for this purpose invn=[1 2 . . . n] or identity. FIG. 13 shows 1801 which is a screenshot of determining the residue and 1802 for determining the carry digits as used in the program of FIG. 12. As an example one may create a radix-256 reversible operation on words of 4 256-state elements. The in256 and key256 may be generated in Matlab by in256=randi([1,256],1,4) and key256=randi([1,256],1,4). To take care of the carry-out and borrow-out the program uses an extra digit at the input, which has no cryptographic significance and only the last 'tele' number of digits are significant. One may have: in256=[1 213 150 141 235] and key256=[1 74 194 193 98]. The reversible 256-state function is sc256=elemtabn(256,8,xor2,2) or derived from bitwise XORing of words of 8 bits in decimal form. Similarly: car256=elemtabn(256,8, and2,2) and bor256=elemtabn(256, 8, bor2,2). This provides from sux=addmodnfsil(sc256, car256,in256,key256,4,inv256) as ciphertext sux=[93 149 45 140] of which the first 256-state element is a carry-out and may be ignored. Reversing the radix-256 operation with dux=addmodnfsil(sc256, bor256,sux,key256,4,inv256) dux=[213 150 141 235], which is the recovered input operand 'in256.' For the input of sux into the dux expression one may apply sux(1)=1 or any other dummy 256-state value, as that will not affect the outcome. For additions being derived from XOR, the addition and subtraction are the same as the function in that case is an involution, hence sc256 being used both in sux and dux expression.

The above as well as a table 2701 in FIG. 20 illustrate a reversible radix-n operation on words of 4 elements. One may change the car256 to a random type 256-state 256 by 256 array by car256=randi([1,256],256,256) which is definitely not a canonical transitional array for n=256. Applying this randomly generated carry or transitional function one gets sux=[87 191 137 27 140] using addmodnfsil routine. One may generate bor256, by flipping the car256 table. This generates dux=[21 172 96 235] which is of course different from the original input word in 256. Because the last digit does not experience a transition or carry, the last digit is determined by the reversible function only. If that is a concern, one may stick an agreed upon but cryptographically unused help digit to the operand words to enforce a carry generated change.

One may call the above encryption modification encryption cloaking. One in essence maintains a data flow in an encryption, but modifies a function without modifying the sum-space or in other words without introducing a bias in the ciphertext. Thus an attacker analyzing a ciphertext generated using the above steps is unable to derive from statistical properties of the ciphertext that a cloaking step was applied. This improves the security of the encryption when the modification is held as confidential. An additional benefit is that even when an attacker in some way has access to the keyword of an encryption, for instance acquired online and generated by PKI steps and cracked with a quantum computer, the attacker still will be unable to directly decrypt the ciphertext as the cloaking has further obfuscated the ciphertext. Encryption methods like AES-GCM and Cha-Cha20 have strong avalanche effects and even a small change in data generates a huge change in the output. Thus even a single cloaking step, for instance in only one AddRoundKey( ) step in AES-GCM or in a quarter-round of ChaCha20 will lead to tremendous and likely unbreakable change. In that case one should apply a cloaking step preferably in an early round of the total number of rounds.

Figure 25:
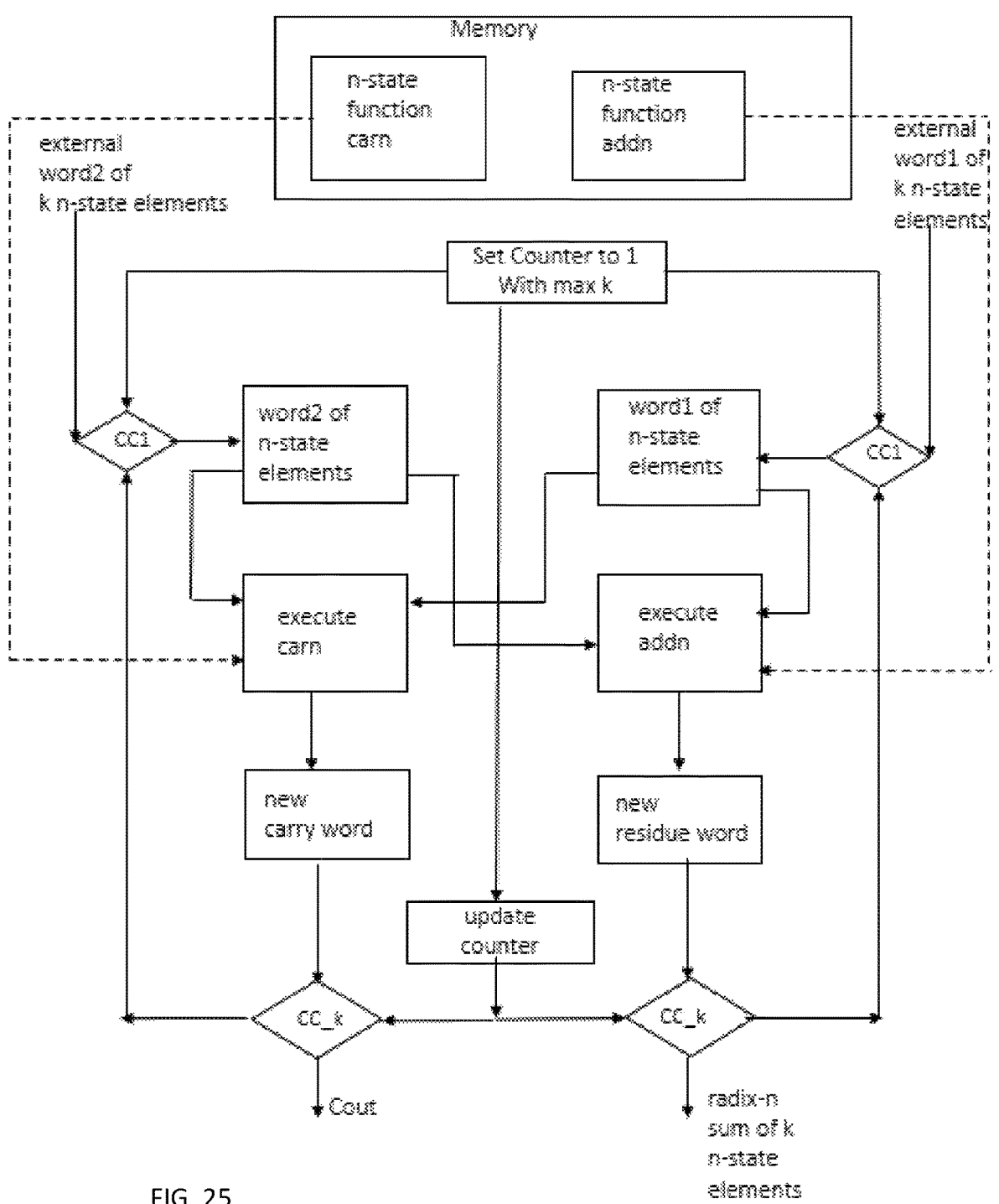
FIG. 25 is a diagram illustrating data flow implemented by computer instructions screenshot of FIG. 12.

FIG. 25 illustrates a dataflow as implemented by instructions as shown in screenshot of FIG. 12. The instruction y=addmodnfsil (addn,carn,inn,keyn,tele,invn) requires that the dataflow is provided with addn (for residue) and carn (for transition element determination) and inn and keyn are two n-state words of tele n-state elements, generating a result or sum of tele n-state elements. FIG. 25 illustrates that addn and carn are retrieved from memory. The rippling of the transition through the operation requires tele steps, including for each step determining a new word of n-state residue elements and of n-state transition or carry elements. A counter is initiated at 1 and set at maximum tele. A test CC1 (for cycle counter CC1) determines if the counter is 1 or not 1. When CC1=1 the new words word1 and word2 are entered. When CC1≠1, the newly generated residue word and transition word are applied as active words. The functions addn and carn are applied to corresponding elements of the active words. After execution of addn and carn, a processor updates the cycle counter and CC_k checks if the maximum count=tele has been surpassed. When not, a next cycle is performed. When CC_k>tele the end result has been achieved and is provided as final residue word of tele n-state elements. A final (potentially unused) transition n-state element Cout may be available. The flow of FIG. 25 corresponds to the illustrative diagram of FIG. 20, which is an illustration for the operation for tele=4.

The number of possible transitional arrays depends on n in radix-n. An n by n table of n-state elements has $(n)^{\wedge}(n^{\wedge}2)$ different instances. For n=256 (using byte-sized words) one has $256^{\wedge}(256^{\wedge}2)=(2^{\wedge}8)^{\wedge}65,536$ different instances or $2^{\wedge}(8*65,536)$ or greater than $2^{\wedge}500,000$ or greater than $10^{\wedge}50,000$. Even with unusable arrays dropped (like all the same elements) this is a staggering number that may not be attacked successfully during the life time of the universe with all computer power available. In a current situation where "harvest now, decrypt later" attacks are already taking place, the above simple but highly secure modification may be a very effective way of Cloud customers to provide additional security for Cloud residing data that benefits from extra security.

The above was illustrated with 4 8-bit words. This may be convenient for instance for an AES state array which is a 4 by 4 array of bytes. It should be clear that one may arrange this in different word sizes as well in different n-state symbols. For instance the AES state array may be treated as a single word of 32 bytes and create a radix-256 operation on 2 words of 16-bytes or treat the AES state array as 2 words of 8 bytes. One may then apply different random or random-like 256-state transitional (carry) functions or tables. The 16 bytes in an AES state array are 128 bits. One may create for instance elements of 10 bits (1024-state element) and create a word of 5 1024-state elements and treat the remaining 78 bits as individual bits to be XORed. Or any other combination of words and n-state elements.

One may consider words of elements of 16 bits or greater. A practical problem for some cases is the size of the related transitional n-state table. However, some functional steps may be applied to implement seemingly random-like n-state transitional tables. For instance one may generate and store an n-state vector or 1D array and create a rule for a transitional n by n array that adds to a content of the vector the index of an operand modulo-n which provides a cyclic effect. One may also shift the vector one or more position alone or in combination with a mod-n addition or any other repeatable rule.

For instance in ChaCha20 as well in hashing such as SHA-256 and other cryptographic operations one may do an addition mod-$2^{\wedge}32$. This is performed as a binary addition with as max result a word of 32-bit of 1s after which the cyclic character of mod-n addition kicks in. One may modify the addition mod-2*32 into a radix-256 (or other) addition with a random or random-like transitional function/table. Instead of doing a 32-bit radix-2 addition one then takes each 8 bits as a 256-state element and the 32-bit word is then operated on as a 4-byte word. Doing a 4-byte radix-256 standard addition will of course generate the same result as a 32-bit radix-2 addition, because only the radix has been modified. However, by modifying the related 256-state transitional array in a radix-256 operation to a non-reversible random or random-like 256-state array, the sum of the radix-256 operation (combining 2 words of 32-bits in a quarter-round in ChaCha20 for instance.)

In the context of the above, which may be called encryption cloaking by radix-n modification, the introduction of a random or random-like n-state transitional function/table may render the radix-n operation non-reversible or irreversible and in a cryptographic sense an original state is not recoverable from such an operation. In for instance AES-GCM, ChaCha-256 and others that is not a problem, as the operation of which the irreducible radix-n operation is part of is a one-way operation anyway. It should be repeatable, for instance to generate a keystream, but bot reversible. This is where many of the AES modes are different from AES-GCM as each step in the reversible AES have to be really reversible. But that is not the case in AES-GCM where AES is used to generate a keystream. Herein a non-reversible n-state transitional function or table, means that it is to be used with a reversible n-state operation for residue generation but that the inclusion of the n-state transitional function or table renders the radix-n operation non-reversible. The n-state transitional array may be invertible in a linear algebra sense, but the corresponding radix-n operation is non-reversible. Thus the term n-state non-reversible transitional function or table in a radix-n operation means that the radix-n operation is non-reversible.

As to the application of function cloaking in hashing one is referred to FIPS PUB 180-4, FEDERAL INFORMATION PROCESSING STANDARDS PUBLICATION: Secure Hash Standard ("SHS"), 2015, downloaded from https://nvlpubs.nist.gov/nistpubs/FIPS/NIST.FIPS.180-4.pdf which is incorporated herein by reference. Similarly, SHS also defines application of $\oplus$ which is bitwise XOR on words of 32-bits, for instance. All may be modified or cloaked as explained herein. This applies to all cryptographic operations that apply operations on multi-bit words that preferably have a uniform or flat sum-space.

It again emphasized that not all additions or bitwise XORs in a cryptographic method need to be modified or cloaked. Many cryptographic operations are operated in multiple rounds. Each round adds to the further mixing and obfuscation of symbols. This is often called the avalanche effect in machine cryptography. It causes minor changes, especially early in the process, including in initial input data, to be thoroughly mixed and changed as to having as output a random looking signal. This even cloaking a single step in encryption and hashing, for instance in the early 60-75% percent of the total rounds has a dramatic and as such an undetectable effect as the output of a method that applies cloaking has a statistical characteristic that is identical to an unmodified method.

It is important if an operation is required to be reversible, such as in encryption, or is one-way, as in hashing. For instance in AES, wherein bitwise XOR is used, for instance for AddRoundKey( ). Furthermore a multiplication over GF(256) is used in MixColumns( ). If one FLTs these steps, one has to take care that operations are performed on the correct size of bit-words. For the multiplication over GF(256) that is not a problem because it operates on bytes. For bitwise XOR on words of bits that is also not a problem. Because the operation is bitwise on words of bits, changed bits in one set of bits does not "spill over" so to speak in other words. If one looks at FIG. 10 of FIPS 197, which describes the AES protocol, one can see that effectively the bitwise XOR is done on bytes, in a columns of 4 bytes. This means that one can interpret AES for the to be FLTed sections as byte operations. These byte operations can be stored as 256 by 256 switching tables and by applying the correct 256-state inverters one may generate the FLTed 256 by 256 switching table. This is illustrated in FIG. 6 as implementation 1000 of a computer implemented program.

However, if ones desires, one may implement the bitwise XOR, on words of 8 bits as illustrated in FIG. 2. Inverter 201 on inputs in1 and in2 are applied to provide inverted n-state inputs on 202 and 204. An operation 210 is implemented in a standard way, for instance as an actual bitwise operation, or as a stored 256-state switching table. The result of 210 is provided on 205 to reversing inverter rinv to generate n-state output on 206 of device 212 as described in diagram 200. Rather than computing and storing an equivalent 256-state FLTed switching table Different FLTed switching tables are achieved by leaving the core (bitwise XOR or equivalent table) intact and changing the inverters.

An n-state operation that creates, what is spill-over in a broken up word, is for instance the addition mod-$2^{32}$, as applied in SHA256 and ChaCha20 for instance. This operation, fortunately, only needs to be repeatable. In ChaCha20 it is used to generate a final keyword and it is part of the rounds in SHA256. The requirements is that when used on different systems or computers with adequate data the same results are generated, The +-mod $2^{32}$ operation is standard and fast in most computers. Because of the size it was determined is unpractical to store the equivalent switching table for + mode-$2^{32}$. It is also unpractical to store 32-bit $2^{32}$ state inverters. Because it is not needed to reverse the + mod=$2^{32}$ operation, the following FLT works very well. Each input of 32-bit words is split into 4 words of k1, k2, k3 and k4 words. In this example 4 words of 8 bits will be used. Input 256-state inverters for the 8-bit words are generated and each 8 bit word is inverted with a 256-state inverter. One may use the same 256-state inverters or different ones and the corresponding reversing inverters are created. The inverted 8 bits are recombined into 32 bit words and the two "inverted" 32-bit words are summed mod-$2^{32}$. The sum is of course also a 32-bit word and is split again in 4 words of 8 bits. Each 8-bit word is inverted with the corresponding reversing inverter to generate 8 bits and the resulting 8 bits are recombined into a 32-bit word. This procedure is also called an FLT but may be called a partial FLT or pFLT, as the inputs and outputs are strictly speaking inverted by 4 n1-state inversions. Though one may consider 4 n1-state inversions of 4 words that form a k bit word to be a $2^k$-state inversion.

Strictly speaking the above inversion has a partial input set to an $2^k$ state inverter. For security one may desire true 2k-state inverters. However, as explained above there are sufficient 256-state inverters to make a successful brute force attack unlikely.

The same applies to bitwise XORing. Splitting up a word of 32-bits seems to generate a sufficiently secure result. However, one may want to operate a true $2^{32}$-state inversion. As stated above, one may use a computational rule to determine an n-state inversion and the corresponding reversing inverter. With the above rule it may be tried to attack inv(i)=a*i+b rules. One way to improve the rule is to FLT the operation, but that requires a $2^{32}$-state FLT.

One aspect of the present invention is that in cloaking a modified preferably non-reversible radix-n operation is used with an n-state reversible function, which ensures that the radix-n operation has a uniform sum-space even when the radix-n operation itself is non-reversible. The n-state transitional function/table is an aspect of that. One may change the radix-n operation by changing the n-state transitional function/table. One may also change the n-state reversible function, for instance by applying an n-state FLT as explained earlier above. Base functions that one may apply to modify with an FLT are 1) modulo-n addition; 2) modulo-n subtraction and 3) addition over GF(n=2ˆk) for n>2. Each of these base functions cannot be generated from each other with an FLT.

There are sufficient different n-state non-reversible transitional functions/table for radix-n operations for n=256 or greater so that no change in reversible n-state function is required. For security reasons and/or for practical reasons one may want to change functions often, for instance when smaller values for n like n–128 or even n=64 or even smaller are used. In that case, changes in n-state reversible functions may be welcome, for instance by FLT, to provide sufficient security. For any or other of the above reasons, one may want to introduce a novel reversible n-state base function, which is an involution that is NOT based in any way on an XOR (or its related EQUAL) function.

An involution herein is generally a commutative n-state function that is its own inverse. For instance assume c=sc (a,b) is a commutative involution, that is c=sc(b,a); a=sc(c, b); a=sc(b,c); b=sc(a,c); and b=sc(c,a). The presumably only n-state function that is known as such is the function often represented as addition over GF(n=2^k). This involution has additional desirable properties in that each element a has an inverse a1 so that sc(a,a1)=z with z a zero element which implies that sc(a,z)=a for all a. Furthermore, the addition over GF(2^k) is associative. These properties are desirable in reversible composite operations. But necessarily for a cloaking operation.

The inventor in U.S. Provisional 63/573,331 to Lablans filed on Apr. 2, 2024 explains in detail how and why n-state involutions that are NOT characterized as additions over finite field GF(2^k) are created. A first way to create such an involution is to generate all self-reversing n-state inverters for n=2^k. Take as an example k=3 or n=8. One can easily see that the rows and columns in the standard addition over GF(8) as in Matlab screenshot 501 of FIG. 5 are all self-reversing 8-state inverters and same index row and column in 501 are identical. First of all one has to determine that there are more than n self-reversing n-state inverters as a necessary condition. In fact there are 764 self-reversing 8-state inverters out of 40,320 reversible 8-state inverters. Using a condition of being commutative one may construct by trial and error a novel commutative 8-state involution. The steps are then: 1) Make set of 8-state self-reversing way applications such as AES-GCM and ChaCha20 and SHA-256 and others. An advantage of these novel involutions is that they are all reversible. The process for finding new involutions for n=16 and greater n=2^k may become computationally prohibitive. One shortcut to create novel involutions for greater values of n is to perform elementwise operations like scin64=elementabn(64,2,scin8,8). That is use elements being words of 2 8-state elements to create 64-state elements and determine the outcome as words of 2 8-state elements by elementwise performing the novel 8-state involution and represent the words as 64-state elements. Yet another way is to extend the table of an involution by using the n rows of an n by n involution table, and for each row add n to elements to form a row extension and attach the row extension to the row they extend to form an extended row. Then for the next n rows, take the first n rows, switch position of the original row and the row extension and make that the new row of row n+1:2*n. The program that does that is doublescn( ) of which a Matlab screenshot is provided in FIG. 22. The resulting table scin16 created from scin8 is shown in screenshot FIG. 23.

Furthermore, one may extend the number of novel non-associative involutions by FLTing the functions.

There are different ways to design a PFT modification, depending if one uses one or two inverters or three different inverters. This is worked out in the following table:

| x1 | x2 | output | ciph | recov x1 |
|---|---|---|---|---|
| inv | inv | — | ciph = inv(x1) + inv(x2) | x1 = rinv(ciph-inv(x2)) |
| inv1 | inv2 | — | ciph = inv1(x1) + inv2(x2) | x1 = rinv1(ciph-inv2(x2)) |
| inv | — | — | ciph = inv(x) + x2 | x1 = rinv(ciph-x2)) |
| — | inv | — | ciph = x1 + inv(x2) | x1 = ciph-inv(x2) |
| — | — | inv | ciph = inv(x1 + x2) | x1 = rinv(ciph)-x2 |
| inv1 | — | inv3 | ciph = inv3(inv1(x1) + x2) | x1 = rinv1(rinv3(ciph)-x2) |
| — | inv2 | inv3 | ciph = inv3(x1 + inv2(x2)) | x1 = rinv3(ciph)-inv2(x2) |
| inv1 | inv2 | inv3 | ciph = inv3(inv1(x1) + inv2(x2)) | x1 = rinv1(rinv3(ciph)-inv2(x2)) | inverters; 2) start with a first (random) row being an 8-state self-reversing inverter and find a complete set of 8-state self-reversing inverters that have no elements in common with another 8-state self-reversing inverter in the earlier set; 3) find the next set that has no common elements in correspondent positions, in the earlier sets; 4) repeat until n 8-state self-reversing inverters were found. Stop the procedure if no compliant 8-state self-reversing inverters are available, and start with a next starting 8-state self-reversing inverter after a procedure has been completed.

FIG. 21 is a screenshot of a partial Matlab program that performs the above steps for n=8. The steps are repetitive, in that every time a new self-reversing inverter is looked for in the set of 369 self reversing 8-state inverters. The procedure 'nosam( )' checks that no columns have elements in common, and 'findRow( )' looks for an inverters with a particular set of beginning elements, dictated by the requirement of being commutative. Ultimately 369 commutative involutions are found of which 353 are not associative and thus are not or are not characterized as an addition over a finite field GF(n). One such non-associative involution is scin8=[1 7 3 4 5 6 2 8; 7 3 2 5 4 8 1 6; 3 2 16 8 4 7 5; 4 5 6 12 3 8 7; 5 4 8 2 17 6 3; 6 8 4 3 7 15 2; 2 17 8 6 5 3 4; 2 17 8 6 5 3 4; 8 6 5 7 3 24 1].

One may use these commutative involutions in any encryption to replace the standard involution. However, because these novel involutions are non-associative one should take care that execution in applications use the same order for encryption and decryption. This includes in one Furthermore, the operations '+' and '−' are used in the above table. One may replace the '+' and '−' with a single involution operation, like the addition over GF(2^k) or a novel non-associative involution.

The inventor has analyzed and described commutative n-state functions for n=2^k and disclosed this in U.S. Provisional Application 63/773,331 to Lablans filed on Apr. 2 2024 which is incorporated by reference and referred to for detailed explanation. The results of the analysis will be applied here. One aspect found is that all additions over GF(n=2^k) described in a lookup table are commutative, thus rows and columns with the same index are identical, while all rows are different and are self-reversing n-state inverters. Furthermore, all rows arranged in a commutative involution matrix only have columns wherein an n-state element occurs exactly once. Thus an n-state commutative involution with k=2^k has n different self-reversing n-state inverters. Furthermore, for instance for n=2^2=4 there are 10 different 4-state self-reversing inverters. For n=8 there are 764 self reversing 8-state inverters out of 40,320 reversible 8-state inverters.

Bitwise operations on words of k bits are also applied in other cryptographic operations beside encryption and decryption. For instance they are applied in hashing or message digest operations, for instance as defined in FIPS PUB 180-4 Secure Hash Standard (SHS) available from https://nvlpubs.nist.gov/nistpubs/FIPS/NIST.FIPS.180-4.pdf which is incorporated herein by reference. SHS defines words of w bits, for instance w=32. For instance the bitwise XOR is applied in functions Maj(x, y, z) (4.3) and Ch(x, y, z) (4.2) as defined in 4.1.2 of FIPS 180-4 on words of 32-bits and shown in FIG. 19. For instance 4.3 may be reformulated as out11=AND256(x1,y1); out12=AND256(x1,z1); and out31=AND256(y1,z1) and aout1=sc256(out11,out12) and out1=sc256(aout1,out13). Herein x1, y1 and z1 are 8 bits of 32 bits. The function sc256 is the addition over GF(2^8) and AND256 is the 256-state representation of the bitwise AND of words of 8 bits.

One may repeat the above substitution for each of the 8-bit words in w=32. When concatenating the results, one gets the desired result of 4.3. In a similar way one may modify operation 4.2 Ch(x, y, z). One may replace the function sc256 (addition over GF(256)) with the 256-state commutative involution NOT being an addition over GF(256). For Ch(x, y, z) that may be a straightforward replacement as this operation has two components combined by sc256. However, for Maj(x, y, z) there are 3 components for determining each set of 8 bits. Unfortunately the 256-state commutative involution not being an addition over GF(2^k) is not associative. Thus the result of aout1=sd256 (out11,out12) and out1=sd256(aout1,out13) and for instance aout1=sd256(out11,out13) and out1=sd256(aout1,out12) may be different. The result is still repeatable, if the same order of execution is observed using non-associative operations on 3 or more operands, such as in (4.4) etc. of FIPS 180-4. Because sd256 is commutative, replacement of sc256 with sd256 in for instance Ch(x, y, z) requires no additional measures.

Furthermore, FIPS 180-4 defines sets of 32-bit and 64-bit word constants, which may be inverted with ML-FSR based inverters. And of course any used n-state commutative involution (being an addition over GF(n) or not) may be FLTed by an ML-FSR based inverter. So for instance in hashing applications one can use the ML-FSR based inverter to invert the input 32-bit or 64-bit words. Because bitwise XOR is on composite elements modified by an operation different from the one used in generating the ML-FSR inverter, the output of an FLT modified Ch(x, y, z) or Maj(x, y, z) using the ML-FSR will generate a modified output. That may be sufficient to modify the hashing operation. However, one may replace the addition over GF(n) (bitwise XOR) with an n-state commutative involution. One should make sure that this involution (if used without other changes) is sufficiently different from the addition over GF(n). This can be achieved by applying a separate (in this case 256-state) FLT to the involution preferably changing the zero-element and one-element. This all makes successful brute force attacks extremely unlikely. It leaves the basic dataflow of hashing intact and provides a customized and secure and private hashing method. The same applies for applying n-state commutative involutions to encryption/decryption, where an additional FLT of the involution will significantly increase security. For instance sc256 (addition over GF(256) and 256-state involution sd256 NOT being such an addition, created by doubling may have a difference of 56%, while an FLT of sd256 may have a difference of 85% with sc256.

A system illustrated in FIG. 7 and as described herein is enabled for receiving, processing and generating data. The system is provided with data that can be stored on a memory 5101. Data may be obtained from a sensor or may be provided from a data source. Data may be provided on an input 5106. The processor is also provided or programmed with instructions executing the methods of the present invention is stored on a memory 5102 and is provided to the processor 5103, which executes the instructions of 5102 to process the data from 5101. Data, such as an image or any other signal resulting from the processor can be outputted on an output device 5104, which may be a display to display data or a loudspeaker to provide an acoustic signal. The processor also has a communication channel 5107 to receive external data from a communication device and to transmit data, for instance to an external device. The system in one embodiment of the present invention has an input device 5105, which may be a keyboard, a mouse, a touch pad or any other device that can generated data to be provided to processor 5103. The processor can be dedicated hardware. However, the processor can also be a CPU or any other computing device that can execute the instructions of 5102, including FPGAs and discrete components. The processor 5103 in some embodiments has integrated or connected to it communication circuitry 5110 with a customized physical interface. A customized interface may be a connector, an antenna, a reader or read/write interface or any other physical interface to transmit and/or receive signals to or from an external device. Accordingly, the system as illustrated in FIG. 7 provides a system for data processing resulting from a sensor or any other data source and is enabled to execute the steps of the methods as provided herein as an aspect of the present invention.

Aspects of the present invention can be advantageously used for and in devices that belong to a controlled community. A controlled community herein means that two devices are instructed, either by locally stored data or from a shared computing device, which cryptographic method to use and how a modified n-state switching function or device is to be determined. Preferably such information is kept confidential between two devices and, if needed, a server. In accordance with an aspect of the present invention, such data is available from a secure server over a secure communication channel. A computing device herein is a device that contains at least one digital device that generates one or more signals in accordance with at least one switching table. The digital device may be but is not limited to a processor, a controller, a memory or storage device such as RAM, DRAM, Flash memory, ROM, PROM, ePROM, disk drive or any other data storage device, combinational circuitry, integrated circuits, FPGA, PLA and the like. Illustrative examples of a computing device include but are not limited to any computer, a desktop computer, a server computer, a blade computer, a processor, a controller, a laptop computer, a tablet computer, a smartphone, a chip card, a smart card, an RFID, a FPGA, a phone, an opening device such as a FOB, a TV set, a media player. A computing device may be a stand-alone device. A computing device may be part of a system wherein the computing device provides and/or receives and/or processes signals such as data signals.

Several computing device community configurations are illustrated in FIG. 8. FIG. 8 has a communication network 6100. Network 6100 may be a single network such as a wireless or wired network or a combination of networks such as the Internet. The network may be a switched network or a packet based network, a private network or a public network or a virtual private network or any other communication network that enables connection of 2 computing devices and of 3 or more computing devices. In one configuration two computing devices 6101 and 6102 with communication circuitry to transmit, receive or transmit/receive signals are provided. The communication circuitry of 6101 and 6102 can transmit signals over a channel 6108. The channel 6108 is identified as a double arrow. This indicates that the channel is bi-directional, but it does not necessarily mean that 6101 and 6102 do both have to transmit and receive, though they may. For instance 6101 is an opening device or a smartcard or any other transmitting device and 6102 is a computing device that is part of an access mechanism that is being activated by one or more signals from 6101. Device 6101 for instance has cryptographic circuitry that generates opening signals that have to be detected and decrypted by 6102. For that application wherein each device has the appropriate instructions and data stored to complete an authenticated transaction, like opening. In one embodiment of the present invention there is thus only one way transmission by 6101 and receiving of data by 6102. The channel is a direct channel, like a wireless or wired or Near Field Communication (NFC) channel, a USB connection, a Bluetooth connection or any other direct connection. For the transaction itself no other channel is required. The devices 6101 and 6102 may have other communication capabilities, such as equipment to connect to network 6100, but are not shown. Devices 6101 and 6102 have different modified n-state switching functions stored on local memory. These may be updated from time to time.

Devices 6101 and 6102 may also perform some mutual authentication or for instance key exchange. In that case 6108 is a dual use (send and receive) channel and the devices 6101 and 6102 both have send a receive equipment. The same applies to devices 6103, 6104, 6105, 6106, 6107 and 6115 and 6116 and communication channels 6109, 6110, 6117, 6118, 6111, 6112, 6113 and 6114.

In one embodiment of the present invention 6115 may be a gateway server and 6116 may represent one or more devices connected to the cloud through gateway server 6115 that may implement machine cryptography as disclosed herein.

Computing devices 6103 and 6104 communicate with each other via channels 6108 and 6110 via network 6100. Cryptographic n-state switching functions may be stored locally and may be provided by secure server 6107 which is connected to network 6100 via channel 6114.

Device 6115 and 6116 communicate directly via a channel 6117. Device 6115 is also able to communicate with secure server 6107 via channel 6114. Devices 6105 and 6106 can directly communicate with each other over channel 6112 and with server 6107 via 6100 over channels 6111 and 6113, respectively. As needed 6105 and 6106 can also communicate via 6111 and 6113 via network 6100. Any of the communication channels, even though illustrated by double sided arrows may be single direction as dictated by practical circumstances.

For instance devices 6115 and 6116 communicate directly via 6112 to complete a transaction, such as withdrawing money from an ATM 6115 machine with a smartcard 6116 and 6115 uses 6118 for verification from 6107 via network 6100. Assume 6116 to be a chipcard or smartcard which is connected to 6115. During an established connection 6116 can be updated with additional or replacement modified n-state switching functions.

Computing devices can be mobile or fixed. For instance 6103 and 6104 are two computing devices that are connected to the Internet, for instance 6103 is a computer, such as a PC, a smartphone, a tablet and 6104 for placing an order and 6104 is a server for processing the order. For instance 6103 is a computing device which may be a server, a computer, a PC, a smartphone, a tablet, a processor and the like to monitor and/or control an IoT (Internet of Things) device 6104 with a processor such as a camera, a medical device, a security device such as a lock or fire monitor, a thermostat, an appliance, a vehicle or any other device.

Terms like hash, signature, ciphertext and the like have been used herein. The purpose is to describe the role of the related data. But these are of course in the sense of computer technology messages that are being transferred between computing devices generally connected through a network. However, data or messages may also carried on a storage device, such as a memory stick, a hard drive, an optical drive a portable device such a a laptop or a smartphone or a tablet and transferred from these devices to another device. Machine cryptography as described herein is applied to protect security and/or authentication of messages, data and/or devices.

A fortuitous effect of using circuits that can be described by switching tables of operations such as mod-n and GF(k) operations, is that one can design in mathematical terms a useful operation, like a calculation and/or an error-correcting coding and/or a cryptographic operation and realize it easily on a computer, because the computer includes the switching operations that are represented by the mathematical operations. It is again emphasized that the computer operations are themselves switching operations or devices and they do not actually perform mathematics, but strictly physical switching between physical states.

A cryptographic device is a device that generates a cryptographic signal from an input signal. A cryptographic signal is a signal derived from an input signal, but wherein the original input signal cannot be easily reconstructed from the cryptographic signal without undue experimentation and effort.

Cryptographic devices include shift register based scramblers and sequence generators, encryption and decryption devices, hash function and message digest devices, signature generators, private and public key generators, MAC and HMAC devices, CRC devices, etc. This definition can be further expanded to: a cryptographic device operates in accordance with a cryptographic purpose and/or specification. The purpose can be encryption/decryption, hash generation, MAC/HMAC, message digest, private/public key generation, digital signature, scrambler, streaming cipher and the like.

The similarity between mathematical operations and switching operations can be captured as a similarity between meta-properties of the mathematical operation and its representing switching table. For simplicity properties will be based on finite fields. This covers automatically properties that other algebraic structures such as groups and rings have.

There are two operations in a finite field GF(n), operation 1 and operation 2. In applications such as cryptography, these operations are called addition and multiplication. The origin thereof can be found in modulo-n addition and multiplication with n being prime, which both are GF(n) operations. For convenience the terms addition and multiplication over a finite field will be used. However, herein these terms mean the above operation 1 and operation 2, even if no direct similarity with known addition and/or multiplication is found.

The properties of the n-state switching tables are as follows:

both operation 1 and operation 2 are closed and are defined for a set of n different states (an operation on n-state inputs, generates an n-state output);

both operation 1 and operation 2 are associative;

operation 1 ($\oplus$) has a neutral element (or one-element) e and an inverse $a^{-1}$ for every element a in the finite field so that $a \oplus e = a$ and $a \oplus a^{-1} = e$. One may also say that each element in the switching table of GF(n) is reversible;

operation 2 ($\otimes$) has a neutral element (or one-element) e
so that a$\otimes$e=a and inverse $a^{-1}$ for every element a
(except a zero-element) so that a$\otimes a^{-1}$=e;

operation 2 ($\otimes$) has a zero-element z so that a$\otimes$z=z;

operation 1 and operation 2 are both commutative; and operation 1 and operation 2 distribute or a$\otimes$(b$\oplus$c)=(a$\otimes$b)
$\oplus$(a$\otimes$c).

In all published operations on finite fields known to the inventor the zero-element used s 0 and the one-element is 1. The use of zero-element 0 and one-element 1 in any kind of arithmetic is well established and explains why no cryptographic operations exist wherein a zero-element is not 0 and/or the one-element is not 1. Operations that are modified in accordance with the FLT are largely mathematically meaningless. For instance an FLT modulo-n operation (addition or multiplication) has no meaning outside the meaning as provided herein. One familiar with modulo-n operations would be unable to place or use FLTed operations. Only after learning about the FLT as disclosed herein or after considerable undue experimentation would one of ordinary skill perhaps be able to assess usefulness of the FLTed switching tables as disclosed herein. At first sight they would merely look as random tables, which is of course very good in the context of cryptography and security. For cryptography, it is beneficial to have circuits that perform like for instance finite field arithmetic while the representing symbols do not comply with known mathematical rules.

Encryption and decryption are reversible operations. Encryption turns cleartext into ciphertext and decryption recovers cleartext from ciphertext. In general one may switch the role of encryption and decryption when they are different procedures, as for instance in standard AES. The encryption is done by CIPH( ) and the decryption by INVCIPH( ). However, one may switch the roles. AES has several reversible or inverse sub-methods like SubBytes( ) for which an inverse has to be applied for recovery. Another sub-method like AddRoundKey( ) is self-reversing and is applied both in encryption and decryption. In AES-GCM the AES part is applied in a one-way manner. That is, the AES part in AES-GCM is used to generate a key-stream. That key-stream is the same in both encryption and decryption. Thus that part of encryption may be called a one-way approach or one-way manner. The same applies to for instance ChaCha20 wherein all the steps of quarter-rounds are the same in encryption and decryption and thus apply a one-way method or approach. This despite that the key-stream generation in principle may be a reversible process. Hashing of course is a one-way approach, as a receiver should want to apply the hashing on a message and arrive at the same hash-value, indicating the authenticity/validity of the message or an indication that most likely the message content was not changed.

The generation of base n-state transition arrays using primitive polynomials are described herein to enable one of ordinary skill to create those arrays. It was also described how one can generate the inverse base array and powers of these arrays like A^h and inverse Ai^h. Herein h is a power at least h=25, preferably at least h=50, more preferably h=100 or most preferably h>1,000,000. A reason for such large values of power h is that it becomes infeasible for an attacker to try all these powers. An while it may look large A^1,000,000 with A is a k by k n-state array still generates a k by k n-state array. Furthermore, a square-and-multiply approach makes authorized generation of such powers of an array fairly easy to do, but not easy to predict. One may pre-generate and store coefficients of appropriate n-state polynomials and plug the coefficients into the canonical forms of base transition and base reversing transition arrays. Only k n-state elements have to be stored and retrieved in that case. One may also store entire A^h and/or Ai^h arrays for retrieval from a storage medium and/or memory.

A level of security is achieved by changing parameters of a cryptographic operation. For instance one may change parameters for different cryptographic messages being generated. For instance use different powers of a base array, and/or use different base transition arrays, and/or use different round or rounds that are modified. One may make the change between different messages, but also within a message. For instance, a large file may be encrypted. In accordance with an aspect of the present invention, one may apply one or more of the modifications disclosed herein to a particular round, or to a block being processed. In accordance with an aspect of the present invention, one or more modification may be to replace a computer function being a bitwise XOR to 2 words of f bits by a computer function that is a commutative n=$2^f$ state involution and is NOT an addition over GF(n). One way to select such a commutative n-state involution is to select an n-state commutative involution that has less than preferably 50% of results in common with an addition over GF(n=$2^k$) and more preferably less than 70% using the same input operands.

The following documents are all incorporated herein by reference in their entirety: 1) Federal Information Processing Standards Publication (FIPS) 197, Advanced Encryption Standard (AES), National Institute of Standards and Technology (NIST), 2001, downloaded from https://nvlpubs.nist-.gov/nistpubs/FIPS/NIST.FIPS.197-upd1.pdf; 2) NIST Special Publication 800-38D, Recommendation for Block Cipher Modes of Operation: Galois/Counter Mode (GCM) and GMAC, NIST, 2007, downloaded from https://nvl-pubs.nist.gov/nistpubs/legacy/sp/nistspecialpublication800-38d.pdf; 3) FIPS PUB 180-4, Secure Hash Standard (SHS), NIST, 2015, downloaded from https://nvlpubs.nist.gov/nist-pubs/FIPS/NIST.FIPS.180-4.pdf; 4) FIPS PUB 202, SHA-3 Standard: Permutation-Based Hash and Extendable-Output Functions, NIST, 2015, downloaded from https://nvl-pubs.nist.gov/nistpubs/FIPS/NIST.FIPS.202.pdf; 5) NIST SP 800-185, SHA-3 Derived Functions: cSHAKE, KMAC, TupleHash, and ParallelHash, 2016, downloaded from https://csrc.nist.gov/pubs/sp/800/185/final; 6) Request for Comments: 1321, The MD5 Message-Digest Algorithm, 1992, downloaded from https://www.ietf.org/rfc/rfc1321.txt; 7) Request for Comments: 7539, ChaCha20 and Poly1305 for IETF Protocols, 2015, downloaded from https://datatracker.ietf.org/doc/html/rfc7539 as well as the 2018 version downloaded from https://datatracker.ietf.org/doc/html/rfc8439. All of the above cases and applications mentioned above are incorporated herein by reference.

Also the following are incorporated herein by reference: U.S. patent application Ser. No. 18/097,396 filed on Jan. 16, 2023; U.S. patent application Ser. No. 17/402,968 filed on Aug. 16, 2021; U.S. patent application Ser. No. 17/240,635 filed on Apr. 26, 2021; U.S. patent application Ser. No. 16/532,489 filed on Aug. 6, 2019; U.S. patent application Ser. No. 16/172,584 filed on Oct. 26 2018; U.S. patent application Ser. No. 15/499,849 filed on Apr. 27, 2017, now U.S. Pat. No. 10,375,252 issued on Aug. 6 2019; U.S. patent application Ser. No. 14/752,997 filed on Jun. 28, 2015, abandoned; U.S. patent application Ser. No. 15/442,556 filed on Feb. 24, 2017 now U.S. Pat. No. 10,515,567 issued on Dec. 24, 2019; U.S. patent application Ser. No. 15/244,985 filed on Aug. 23, 2016 now U.S. Pat. No. 10,650,373 issued on May 12, 2020. All of the above cases and applications mentioned above are incorporated herein by reference A cryptographic device is a computing device that executes instructions upon input data that are used in a cryptographic application, including encryption, decryption, hashing, signature generation and validation, key exchange operations and any other cryptographic operation that results in generating cryptographic data. A cryptographic message may be a message generated by a cryptographic device and that is transmitted to another device in which the cryptographic data is impossible or at least is intractable to invert to original data at least without having all confidential cryptographic parameters. The harder it is to reconstruct original data from cryptographic data with access to required parameters, the more secure the cryptographic data is.

The terms array and matrix are used herein. A matrix is a mathematical term. An array is a structured representation of sets of data in a computer. In that sense an array may be represented by a matrix. Where the term matrix is used in relation to a computer operation the term array may be used as a more accurate descriptin. But in the context of explanation such distinction is less important. Under condition that one understands that a matrix on a computer is in fact an array.

The conversion of long bit sequences to words of n-state elements may range from for instance sequences of 32 bits or more, into at least 4 256-state elements. Or 128 bits or more into at least 16 256-state elements. Or using an entire set of 512-bits and convert into at least 64 256-state elements. Or use an input of 1600 bits and convert to 200 256-state elements.

It should be clear that n-state and number of n-state symbols may be exchanged or optimized. A lower k or number of n-state elements provides smaller k by k arrays but a larger n (from n=256 to n=1024 for instance) requires for instance larger look-up tables. So a sequence of 1600 bits may be managed as 200 256-state elements or as 160 1024-state elements.

In accordance with various aspects of the present invention, methods and devices have been provided that cloak cryptographic operations by modifying computer functions. In one embodiment the cloaking is achieved by operating on a sequence of bits as being p $n=2^k$ state elements and introducing a random or random-like n-state carry or n-state transitional function and processing 2 sequences of bits with a radix-n operation on p n-state symbols. A radix-n operation is short-hand term for a ripple or ripple like addition-like operation. This in the sense that an n-state reversible function is applied to generate an n-state residue of processing two n-state symbols in the p element word with the reversible n-state function and a carry-like or transitional n-state element by using a novel non-canonical (or not known) transition/carry/borrow function. The radix-n operation thus follows the schedule of a radix-n (ripple adder like) addition or subtraction. However, in the cloaking case the radix-n operation is preferably not reversible. Furthermore, any reversible n-state operation may be applied, including a novel involution and any n-state transitional function. Because the radix-n operation is preferably not reversible using terms like addition or subtraction for the radix-n operation is meaningless and if so used may refer to the reversible operation. An n-state transitional function in combination with the n-state reversible function in the cloaked n-state radix-n operation preferably is random or random like. One condition may be that each n-state elements in the n-state transitional function as output has no more than $n+n/2$ occurrences and not fewer than $n-n/2$ occurrences. Another criterion is that an n-state transition/transitional function represented by a look-up table has no row that has n of the same n-state symbols. Another criterion is that an n-state transition/transitional function represented by a look-up table has no row that has more than $n/2$ of the same n-state symbols. Another criterion is that the n-state transition function does NOT have a corresponding n-state transition function that enables a reversing radix-n operation that recovers an input operand from the output of the original radix-n operation. Another criterion is that no more than n zero-elements occur in the n-state transition function or table. An n-state transition function may be characterized by an n by n n-state table. One other criterion may be that an n-state transition table does not have 0 or its equivalence as being a lowest state value element as zero-element. Certain n-state reversible n-state functions like modulo-n addition, modulo-n subtraction and additions over GF(n=2^k) have a canonical structure for corresponding n-state transition functions or tables. In accordance with an aspect of the present invention an applied n-state transition function does not have a canonical form. FLTed functions from canonical structures are expressly NOT canonical structures.

In accordance with an aspect of the present invention an n-state reversible function may be one of: 1) a modulo-n addition 2) a modulo-n subtraction; 3) an addition over a finite field GF(n); 4) an addition over a finite field GF(n=2^k) 5) an n-state involution that is not characterized as associative; 6) an n-state involution with $n=2^k$ that is not an addition over GF(n=2^k).

All aspects of the present invention are computer implemented. This means that everything as required is realized as hardware executable instructions. That means that any computer instruction is ultimately a physical device that may be switched between physical states. Nothing herein happens by itself or by wishing it or by thinking it. In that context it is useful to point out that a function or n-state function is in actuality a physical device. As discussed earlier, one may characterize an operation as for instance a modulo-n addition function. Herein, it means specifically that the description, from the earlier provided Blaauw interpretation, is at the level of an implementation for instance. It is relatively easy to understand to describe the functionality in terms of for instance Matlab instructions. But once the Matlab instructions are executed or are able to be modified and executed, one should be rationally aware that underlying hardware performs the execution and nothing abstract happens, but only physical processes.

Herein the term FLTed function is used. This relates to a modification of an n-state function. It may be said a function is either a pure FLT as shown in FIG. 1. That is, operands are first inverted and then the inverted operands are processed by the function and then the result is inverted with the reversing inverter. Additionally, for functions that may be conveniently stored in a lookup table, one may run the configuration of FIG. 1 and store the generated outcome in a lookup table. This may work for tables up to n=10,000 and provides a very fast lookup. Both implementations are explicitly covered by the term FLTed function herein.

Randomness of transitional n-state functions may be of significance. The randomness may be achieved in several ways. A simple way is to generate a random or pseudo-random n by n n-state look-up table which may easily be achieved by using standard a "programmed randomizer" which is often an instruction in a programming language like Matlab. For instance a pseudo-random or random-looking 8 by 8 8-state table may be generated by the instruction car8=randi([1,8], 8,8). In order to force a more random looking seed one may initialize a seed in Matlab as: rng ('shuffle'). If one desires a cryptographically secure randomness one may open in Matlab a Java object with secureRandom=java.security.SecureRandom( ); and generate each element individually with randomIntegers(i)=secureRandom.nextInt(8)+1; and place in desired position in an array. FIG. 24 illustrates the generation of 2 8-state tables using this approach in consecutive steps generating 2401 and 2402 and showing their difference. The random property is evidenced by generating for instance 1000 arrays and determining the occurrences of the different states. The inventor also performed the generation of different 256 by 256 256-state arrays and noticed that the difference of these arrays generated only very few zero elements, which is to be expected when n is a larger integer. Python also has cryptographically quality random integer generator, for instance in the 'secret' module. C also has a cryptographically secure random generator, for instance in its libsodium module. The Linux kernel includes a cryptographically secure random number generator (CSPRNG). And so on. Thus a cryptographically secure integer generator which is called herein a "programmed randomizer" is well known in computer technology and is used herein to generate random n by n n-state arrays.

In general the use of n-state n by n characterized transitional functions wherein any of n states may occur is beneficial for a random property. However, it is expressly enabled to select only a set of states from n-states. So, one may select for instance only elements {1, 4, 7 and 8} to occur from {1,2, 3, 4, 5, 6, 7 8} to occur in an 8-state transition function, for instance. In general selecting only a subset of all possible n-state elements will, if used now and then, not seriously affect security when n is fairly large as in n=256 or greater.

The ability to store large n-state look-up tables is limited by the available storage capability. While one may store tables of up to 256 GB on a flashdrive, this practically still limits the word size for which a table may be created and for effective use on smaller computers 32-bit tables seem to be more of a challenge to implement. One way to create a pseudo-random but repeatable way to generate ad hoc n-state transition elements is by using pre-selected n-state feedback shift registers or FSRs. How to create a Maximum Length n-state FSR with a shift register of k n-state elements is taught in U.S. Non-provisional patent application Ser. No. 18/741,663 filed on Jul. 20, 2024 to Lablans, which is incorporated herein by reference. The FSR in Ser. No. 18/741,663 ("the 663 application") may be applied to reversibly inverter a n^k-state element by running the FSR for a number of t cycles. The original element may be recovered by using the n-state representation of the n^k-state element in the shift register and running the FSR in reverse direction for pt cycles and the content of the FSR is the recovered n^k-element, One may apply the FSR to generate pseudo-random n-state elements. For instance, one may run the FSR for t cycles by applying an initial content of the k n-state elements of the FSR. One may use the FSR content of one of the k n-state elements as the pseudo-random n-state value of the transition array. One may define a transition element of inputs inrow, incol as position t=inrow*(n−1)+incol and run the FSR for a number of cycles determined by t and use one of the k positions in the shift register as a value of an n-state transitional element. Or even 2 or more n-state elements of the FSR. One may apply additional rules to further deterministically modify the outcome, for instance by a modulo-n addition. The use of the FSR enables to circumvent the need for extremely large memory sizes. For instance for words of 32-bit addition, one may use an ML-FSR of 8 8-bit elements which is an 256^8 state FSR. The FSR, because it is ML, will generate 256^8-1 unique contents. However, 4 of the 8 FSR elements will create a series of 256^4 elements which is of course 2^32 as required. One may change the variations by selecting different FSRs and/or selecting just one or more of the n-state elements in the FSR. As shown in the 663 application, one really doesn't have to fully evaluate t cycles, but can compress the number of steps by pre-calculating the required transitional array that characterizes the FSR performing a certain number of steps.

In accordance with an aspect of the present invention, one may want to use only random or random-like n-state transition functions of which uniformity of states may be computed. For a uniform distribution the probability of a generated n-state is 1/n, with a standard deviation sigma=sqrt(n^2−1)^/12). For a generated n by n n-state table, one may compute the actual expectation and variance of all states in the array. One may then apply a statistical test, for instance the chi-square test to determine if a pre-determined confidence level has been met. Other tests that one may apply include the G-test, Fisher Test, and K-S test. For practical purposes one may require that the uniformity of the n-state transitional function preferably meets at least an 80% confidence level of uniformity based on a chi-square test and more preferably at least a 90% confidence level of uniformity. A distribution that is substantially uniform herein has at least an 80% confidence level under a chi-square test.

The article 'a' herein signifies one or more instances of an element, unless specifically intended otherwise. In most cases one may derive from the text which one is intended.

The invention claimed is:

1. A cryptographic device, comprising:
a memory in a first computing device enabled to store data in and to retrieve data from, including instructions;
a processor in the first computing device configured to retrieve instructions from the memory to perform the steps:
implementing an n-state reversible 2 operand function and an n-state 2 operand transition function;
processing as a radix-n operation upon two series of p bits as two words of k n-state elements, the radix-n operation generating with the n-state reversible 2 operand function an n-state residue element and with the n-state 2 operand transition function on an n-state transition element, with n an integer greater than 3, k an integer greater than 1 and p an integer being 16 or greater;
generating with the n-state reversible 2 operand function with as input operands the n-state residue element and the n-state transition element an n-state output element in an output word of k n-state elements, wherein the radix-n operation is a non-reversible operation;
generating a cryptographic message from the output word of k n-state elements in an encryption or a hashing of an electronic message; and
outputting the cryptographic message on a physical transmission channel to a second computing device.

2. The cryptographic device of claim 1, wherein n=2^k.

3. The cryptographic device of claim 2, wherein the n-state reversible 2 operand function is characterized as an addition over GF(n), with GF(n) being a finite field of n different elements.

4. The cryptographic device of claim 2, wherein the n-state reversible 2 operand function is a commutative involution that is not characterized as an addition over GF(n), with GF(n) being a finite field of n different elements.

5. The cryptographic device of claim 1, wherein the n-state 2 operand transition function is characterized by an n by n n-state lookup table, with no more than n+n/2 and not fewer than n/2 of each n-state element.

6. The cryptographic device of claim 1, wherein the k n-state elements are part of a state array in an Advanced Encryption Standard—Galois Counter Mode (AES-GCM) encryption and at least one round in an AES-GCM key-stream generation is modified by replacing a bitwise XOR of the two words of p bits in the state array by the radix-n operation on k n-state elements.

7. The cryptographic device of claim 1, wherein the k n-state elements are part of a state array in an ChaCha20 encryption and at least one quarter-round in a ChaCha20 keystream generation is modified by replacing a bitwise XOR of the two words of p bits in the state array by the radix-n operation on k n-state elements.

8. The cryptographic device of claim 7, wherein the k n-state elements are part of a state array in an ChaCha20 encryption and at least one quarter-round in a ChaCha20 keystream generation is modified by replacing an addition modulo-2^32 of two words of p bits in the state array by the radix-n operation on k n-state elements.

9. The cryptographic device of claim 1, wherein the n-state reversible 2 operand function is an FLTed version of another n-state reversible 2 operand function.

10. The cryptographic device of claim 1, wherein n-state 2 operand transition function is an FLTed version of another n-state 2 operand transition function.

11. A computer implemented operation, comprising:
implementing an n-state reversible 2 operand function and an n-state 2 operand transition function on the computer;
processing a radix-n operation on two series of p bits as two words of k n-state elements, the radix-n operation generating with the n-state reversible 2 operand function an n-state residue element and with the n-state 2 operand transition function an n-state transition element, with n an integer greater than 3, k an integer greater than 1 and p an integer being 16 or greater;
generating with the n-state reversible 2 operand function with the n-state residue element and the n-state transition element as input operands an n-state output element in an output word of k n-state elements, wherein the radix-n operation is a non-reversible operation;

generating a cryptographic message from the output word of k n-state elements in an encryption or a hashing of an electronic message; and
outputting the cryptographic message on a physical transmission channel to a second computing device.

12. The computer implemented operation of claim 11, wherein n=2^k.

13. The computer implemented operation of claim 12, wherein the n-state reversible 2 operand function is characterized as an addition over GF(n), with GF(n) being a finite field of n different elements.

14. The computer implemented operation of claim 12, wherein the n-state reversible 2 operand function is a commutative involution not characterized as an addition over GF(n), with GF(n) being a finite field of n different elements.

15. The computer implemented operation of claim 12, wherein the n-state 2 operand transition function is characterized by an n by n n-state array, with no more than n+n/2 and not fewer than n/2 of each n-state element.

16. The computer implemented operation of claim 11, wherein the k n-state elements are part of a state array in an Advanced Encryption Standard—Galois Counter Mode (AES-GCM) encryption and at least one round in an AES-GCM keystream generation is modified by replacing a bitwise XOR of the two words of p bits in the state array by the radix-n operation on k n-state elements.

17. The computer implemented operation of claim 11, wherein the k n-state elements are part of a state array in an ChaCha20 encryption and at least one quarter-round in a ChaCha20 keystream generation is modified by replacing a bitwise XOR of the two words of p bits in the state array by the radix-n operation on k n-state elements.

18. The computer implemented operation of claim 11, wherein the k n-state elements are part of a state array in an ChaCha20 encryption and at least one quarter-round in a ChaCha20 keystream generation is modified by replacing an addition modulo-2^32 of two words of p bits in the state array by the radix-n operation on k n-state elements.

19. The computer implemented operation of claim 11, wherein the n-state reversible 2 operand function is an FLTed version of another n-state reversible 2 operand function.

20. The computer implemented operation of claim 11, wherein n-state 2 operand transition function is an FLTed version of another n-state 2 operand transition function.

\* \* \* \* \*